US012334011B2

(12) United States Patent
Kwon

(10) Patent No.: US 12,334,011 B2
(45) Date of Patent: Jun. 17, 2025

(54) DISPLAY DEVICE CONFIGURED TO LOWER A PIXEL DRIVING VOLTAGE DURING A SKIP FRAME PERIOD AND DRIVING METHOD THEREOF, AND MOBILE TERMINAL INCLUDING THE DISPLAY DEVICE

(71) Applicant: LG DISPLAY CO., LTD., Seoul (KR)

(72) Inventor: Yong Chul Kwon, Paju-si (KR)

(73) Assignee: LG Display Co., Ltd., Seoul (KR)

( * ) Notice: Subject to any disclaimer, the term of this patent is extended or adjusted under 35 U.S.C. 154(b) by 0 days.

(21) Appl. No.: 18/221,079

(22) Filed: Jul. 12, 2023

(65) Prior Publication Data

US 2024/0194137 A1 Jun. 13, 2024

(30) Foreign Application Priority Data

Dec. 9, 2022 (KR) ........................ 10-2022-0171519

(51) Int. Cl.
*G09G 3/3233* (2016.01)
*G09G 3/20* (2006.01)

(52) U.S. Cl.
CPC ......... *G09G 3/3233* (2013.01); *G09G 3/2096* (2013.01); *G09G 2300/0819* (2013.01); *G09G 2300/0842* (2013.01); *G09G 2300/0866* (2013.01); *G09G 2310/08* (2013.01); *G09G 2320/0233* (2013.01); *G09G 2330/021* (2013.01); *G09G 2340/0435* (2013.01)

(58) Field of Classification Search
USPC .......................................................... 345/690
See application file for complete search history.

(56) References Cited

U.S. PATENT DOCUMENTS

| | | | | |
|---|---|---|---|---|
| 2014/0320465 | A1* | 10/2014 | Oh | G09G 3/3688 345/204 |
| 2020/0372853 | A1* | 11/2020 | Park | G09G 3/3233 |
| 2021/0110751 | A1* | 4/2021 | Choi | G09G 3/20 |
| 2021/0261863 | A1* | 8/2021 | Kim | G02F 1/13775 |

FOREIGN PATENT DOCUMENTS

| | | | | |
|---|---|---|---|---|
| KR | 20140070793 | A | * | 6/2014 |
| KR | 10-2020-0064549 | A | | 6/2020 |
| KR | 20200064549 | A | * | 6/2020 |
| KR | 10-2020-0134387 | A | | 12/2020 |
| KR | 10-2021-0068814 | A | | 6/2021 |
| KR | 20210068814 | A | * | 6/2021 |

* cited by examiner

*Primary Examiner* — Kirk W Hermann
(74) *Attorney, Agent, or Firm* — Fish & Richardson P.C.

(57) ABSTRACT

A display device includes a display panel on which a plurality of data lines, a plurality of gate lines, and a plurality of pixels to which a pixel driving voltage is supplied are disposed, a display panel driving circuit configured to scan the plurality of pixels and write pixel data to the plurality of pixels during a refresh frame period of a refresh frame; and a power circuit configured to output a pixel driving voltage and decrease the pixel driving voltage in a skip frame period of a skip frame in which scanning of the plurality of pixels is skipped.

18 Claims, 22 Drawing Sheets

DISPLAY DEVICE CONFIGURED TO LOWER A PIXEL DRIVING VOLTAGE DURING A SKIP FRAME PERIOD AND DRIVING METHOD THEREOF, AND MOBILE TERMINAL INCLUDING THE DISPLAY DEVICE

CROSS-REFERENCE TO RELATED APPLICATIONS

This application claims priority to and the benefit of Korean Patent Application No. 10-2022-0171519, filed Dec. 9, 2022, the disclosure of which is incorporated herein by reference in its entirety.

BACKGROUND

1. Technical Field

The present disclosure relates to a display device and a driving method thereof capable of low power driving, and to a mobile terminal.

2. Discussion of Related Art

An organic light-emitting display device includes an organic light-emitting diode (hereinafter referred to as "OLED") which emits light by itself and has an advantage that its response speed is fast and its luminous efficiency, luminance, and viewing angle are large. The organic light-emitting display device has a fast response speed, excellent luminous efficiency, luminance, and viewing angle, and has excellent contrast ratio and color reproducibility since it may express black grayscales in full black.

The organic light-emitting display device does not require a backlight unit, and may be implemented on a plastic substrate, a thin glass substrate, or a metal substrate, which is a flexible material. Accordingly, flexible displays may be implemented with organic light-emitting display devices.

Recently, the market for mobile terminals using the organic light-emitting display devices is expanding. The mobile terminals are required to be driven with low power. However, due to the large amount of power applied to the pixels and the use of various algorithms to improve image quality, it is difficult to design a low power device.

SUMMARY

The present disclosure has been made in an effort to address aforementioned necessities and/or draw backs.

The present disclosure provides a display device and a driving method thereof capable of low power driving, and a mobile terminal.

It should be noted that objects of the present disclosure are not limited to the above-described objects, and other objects of the present disclosure will be apparent to those skilled in the art from the following descriptions.

To achieve these and other aspects of the inventive concepts, as embodied and broadly described herein, a display device according to an aspect of the present disclosure includes a display panel on which a plurality of data lines, a plurality of gate lines, and a plurality of pixels to which a pixel driving voltage is supplied are disposed: a display panel driving circuit configured to scan the pixels and write pixel data to the pixels during a period of a refresh frame: and a power circuit configured to output the pixel driving voltage and lower the pixel driving voltage in a period of a skip frame in which scanning of the pixels is skipped.

The pixel driving voltage may be applied to all of the pixels at a default voltage level during the period of the refresh frame, and applied to all of the pixels at a low potential level lower than the default voltage level during the period of the skip frame.

The display panel driving circuit may scan the pixels disposed in a refresh area of the display panel to write pixel data to the pixels during a refresh period of a partial refresh frame, and skip the pixels disposed in a skip area of the display panel during a skip period of the partial refresh frame. The power circuit may lower an average voltage of the pixel driving voltage during the skip period of the partial refresh frame.

The pixel driving voltage may be applied to the pixels belonging to the refresh area at the default voltage level during the refresh period, and applied to the pixels disposed in the skip area at the low potential level lower than the default voltage level during the skip period.

The power circuit may lower the pixel driving voltage to a first low potential level in response to a first digital brightness value, and lower the pixel driving voltage to a second low potential level lower than the first low potential level in response to a second digital brightness value lower than the first digital brightness value.

The power circuit may lower the pixel driving voltage to a first low potential level in response to a first digital brightness value, and lower the pixel driving voltage to a second low potential level lower than the first low potential level in response to a second digital brightness value lower than the first digital brightness value, during the skip period of the partial refresh frame period.

The power circuit may allow the low potential level of the pixel driving voltage applied to pixels spaced apart from the power circuit by a first distance lower than the low potential level of the pixel driving voltage applied to pixels spaced apart from the power circuit by a second distance. The second distance may greater than the first distance.

The power circuit may lower the low potential level when an image with a lower average luminance is inputted than an image with a higher average luminance.

The power circuit may lower the low potential level when an amount of current and resistance (IR) drop of the display panel decreases.

The display device further includes a control circuit configured to calculate the amount of IR drop based on a result of analyzing the input image and control the power circuit based on the IR drop amount.

The power circuit may gradually rise the low potential level during the period of the skip frame.

The power circuit may gradually rise the low potential level during the skip period of the partial refresh frame period.

The power circuit may change a voltage level of the pixel driving voltage to the low potential level during a vertical blank period before changing from the refresh frame to the skip frame, and change the voltage level of the pixel driving voltage to the default voltage level during the vertical blank period before changing from the skip frame to the refresh frame.

The power circuit may change a voltage level of the pixel driving voltage to the default voltage level within the skip period before entering from the skip period to the refresh period.

The gate lines include a plurality of scan lines to which scan signals synchronized with a data voltage are sequentially applied, and a plurality of emission control lines to which light emission control signals are sequentially applied. The display panel driving circuit includes a data driver configured to output the data voltage to the data lines, a scan driver configured to output the scan signals to the scan lines during the period of the refresh frame and a refresh period of the partial refresh frame: and an emission control driver configured to output the emission control signals to the emission control lines during the period of the refresh frame and the refresh period of the partial refresh frame, the period of the skip frame, and the skip period of the partial refresh frame.

In one aspect, a method of driving a display device include supplying a pixel driving voltage to a plurality of pixels disposed on a display panel: writing pixel data to the pixels by scanning the pixels during a period of a refresh frame: the pixels maintaining a data voltage previously charged during a period of a skip frame: and lowering the pixel driving voltage in the period of the skip frame.

In one aspect, a mobile terminal include a display panel on which a plurality of data lines, a plurality of gate lines, and a plurality of pixels to which a pixel driving voltage is supplied are disposed: a driver integrated circuit (IC) configured to output the pixel driving voltage at a default voltage level during a period of a refresh frame, scan the pixels, and output the pixel driving voltage at a low potential level lower than the default voltage level during a period of a skip frame and a period of a partial refresh frame: and a host system configured to provide pixel data of an input image, frame identification information, and digital brightness value information to the driver IC. The frame identification information includes information indicating at least one of the periods of the refresh frame, the skip frame, and the partial refresh frame.

According to the present disclosure, the display device and the mobile terminal may be driven with a low power without deterioration of the image quality by lowering the average voltage of the pixel driving voltage applied to the pixels in the skip area of the partial refresh frame and during the period of the skip frame.

According to the present disclosure, power consumption may be further reduced by appropriately adjusting the low potential level of the pixel driving voltage according to the digital brightness value DBV and an amount of IR drop of the display panel.

According to the present disclosure, the pixel driving voltage may be increased in advance during the period of the skip frame and within the skip area of the partial refresh frame to drive the pixels in the refresh frame or the refresh area, and the pixel driving voltage may be changed after entering the skip frame or the skip area when switching from the refresh frame or the refresh area to the skip frame or the skip area, thereby preventing deterioration of the image quality when the pixel driving voltages change.

According to the present disclosure, when a period of the skip frame and the application time to apply the pixel driving voltage to the skip area of the partial refresh frame and during the period of the skip frame become increase, the luminance change of the pixels may be suppressed by gradually increasing the low potential level of the pixel driving voltage.

Effects which may be achieved by the present disclosure are not limited to the above-mentioned effects. That is, other objects that are not mentioned may be obviously understood by those skilled in the art to which the present disclosure pertains from the following description.

BRIEF DESCRIPTION OF THE DRAWINGS

The above and other objects, features, and advantages of the present disclosure will become more apparent to those of ordinary skill in the art by describing exemplary embodiments thereof in detail with reference to the attached drawings, in which.

DETAILED DESCRIPTION

Figure 1:
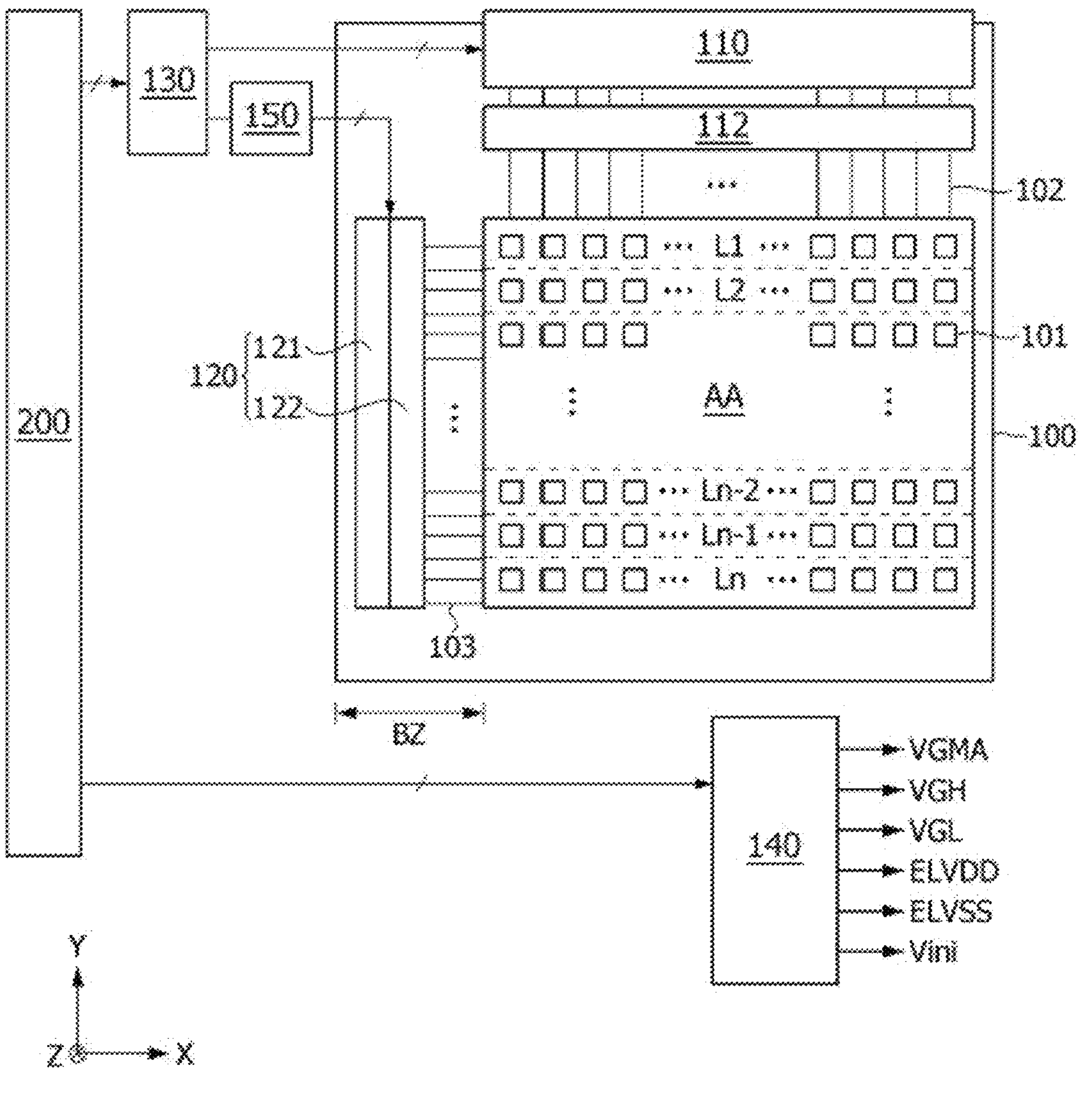
FIG. 1 is a block diagram illustrating a display device in accordance with some aspects of the present disclosure.

The advantages and features of the present disclosure and methods for accomplishing the same will be more clearly understood from embodiments described below with reference to the accompanying drawings. However, the present disclosure is not limited to the following embodiments but may be implemented in various different forms. Rather, the present embodiments will make the disclosure of the present disclosure complete and allow those skilled in the art to completely comprehend the scope of the present disclosure. The present disclosure is only defined within the scope of the accompanying claims.

The shapes, sizes, ratios, angles, numbers, and the like illustrated in the accompanying drawings for describing the embodiments of the present disclosure are merely examples, and the present disclosure is not limited thereto. Like reference numerals generally denote like elements throughout the present specification. Further, in describing the present disclosure, detailed descriptions of known related technologies may be omitted to avoid unnecessarily obscuring the subject matter of the present disclosure.

The terms such as "comprising," "including," "having," and "consist of" used herein are generally intended to allow other components to be added unless the terms are used with the term "only." Any references to singular may include plural unless expressly stated otherwise.

Components are interpreted to include an ordinary error range even if not expressly stated.

When a positional or interconnected relationship is described between two components, such as "on top of," "above," "below;" "next to," "connect or couple with," "crossing," "intersecting," or the like, one or more other components may be interposed between them, unless "immediately" or "directly" is used.

When a temporal antecedent relationship is described, such as "after", "following", "next to", "before", or the like, it may not be continuous on a time base unless "immediately" or "directly" is used.

The terms "first," "second," and the like may be used to distinguish components from each other, but the functions or structures of the components are not limited by ordinal numbers or component names in front of the components.

The following embodiments may be partially or entirely bonded to or combined with each other and may be linked and operated in technically various ways. The embodiments may be carried out independently of or in association with each other.

In a display device of the present disclosure, a pixel circuit and a gate driving circuit may include a plurality of transistors. Transistors may be implemented as oxide thin film transistors (TFTs) including an oxide semiconductor, low temperature polysilicon (LTPS) TFTs including low temperature polysilicon, or the like. Further, each of the transistors may be implemented as a p-channel TFT or an n-channel TFT.

A transistor is a three-electrode element including a gate, a source, and a drain. The source is an electrode that supplies carriers to the transistor. In the transistor, carriers start to flow from the source. The drain is an electrode through which carriers exit from the transistor. In a transistor, carriers flow from a source to a drain. In the case of an n-channel transistor, since carriers are electrons, a source voltage is a voltage lower than a drain voltage and electrons may flow from a source to a drain. The n-channel transistor has a direction of a current flowing from the drain to the source. In the case of a p-channel transistor (p-channel metal-oxide semiconductor (PMOS)), since carriers are holes, a source voltage is higher than a drain voltage and holes may flow from a source to a drain. In the p-channel transistor, since holes flow from the source to the drain, a current flows from the source to the drain. It should be noted that a source and a drain of a transistor are not fixed. For example, a source and a drain may be changed according to an applied voltage. Therefore, the disclosure is not limited due to a source and a drain of a transistor. In the following description, a source and a drain of a transistor will be referred to as a first electrode and a second electrode.

A gate signal alternates between a gate-on voltage and a gate-off voltage. A transistor is turned on in response to a gate-on voltage and is turned off in response to a gate-off voltage.

Hereinafter, various embodiments of the present disclosure will be described in detail with reference to the accompanying drawings.

Figure 2:
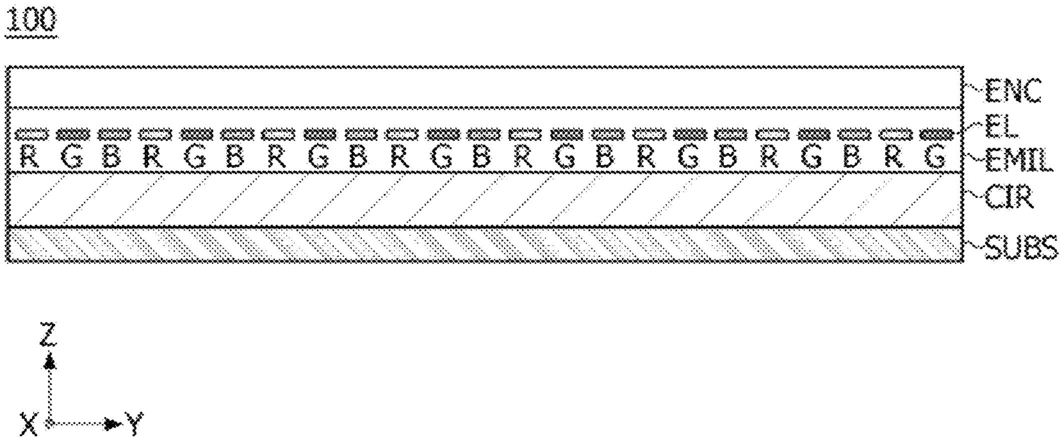
FIG. 2 is a cross-sectional view illustrating a cross-sectional structure of the display panel shown in FIG. 1.

FIG. 1 is a block diagram illustrating a display device according to one aspect of the present disclosure: FIG. 2 is a cross-sectional view illustrating a cross-sectional structure of the display panel shown in FIG. 1: and FIG. 3 is a schematic representation of a mobile terminal.

Figure 3:
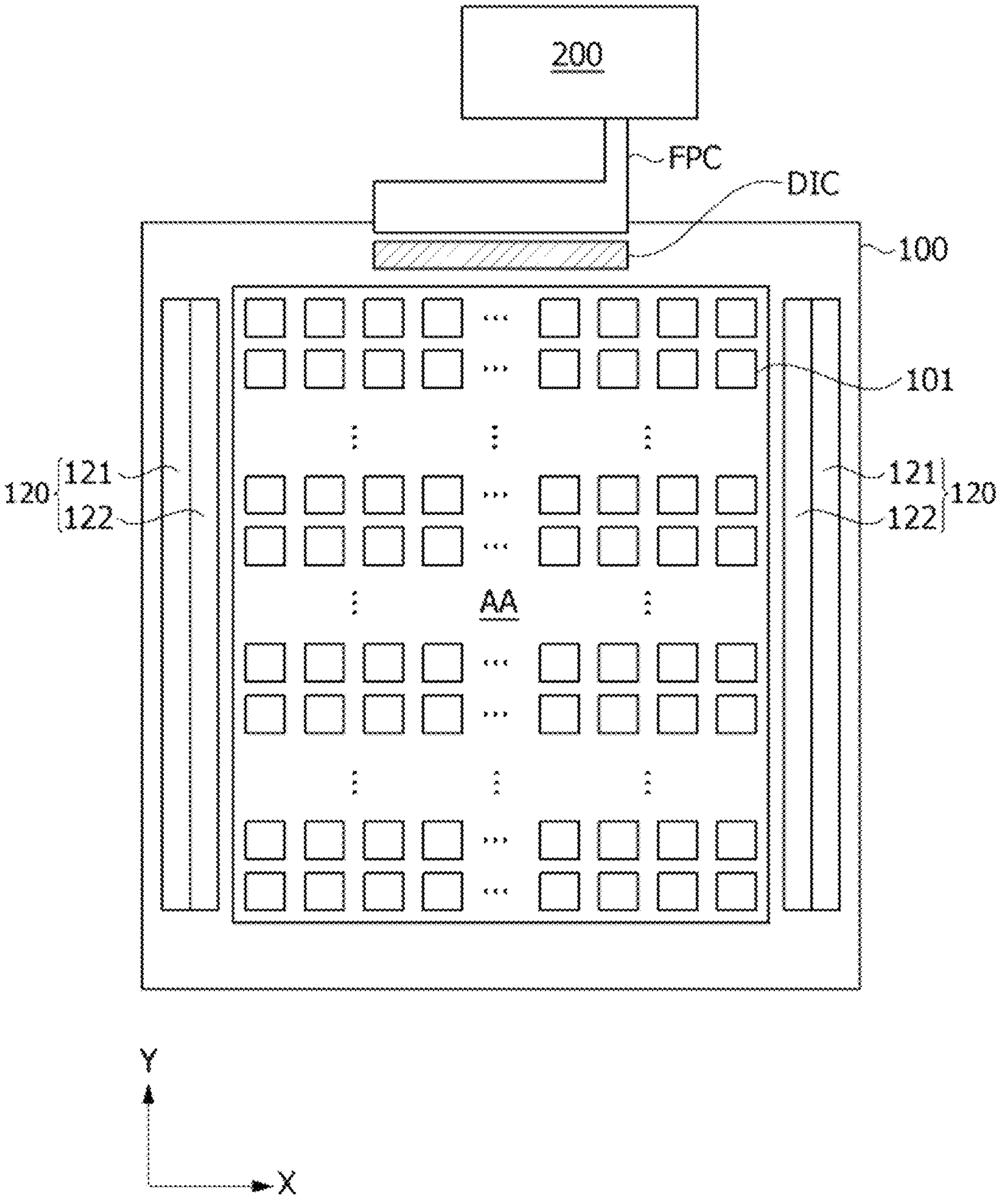
FIG. 3 is a schematic representation of a mobile terminal.

Referring to FIGS. 1 to 3, the display device according to an aspect of the present disclosure includes a display panel 100, a display panel driving circuit for writing pixel data to pixels in the display panel 100, and a power circuit 140 for generating power for driving the pixels and the display panel driving circuit.

The display panel 100 may have a rectangular structure with a length in the X-axis direction, a width in the Y-axis direction, and a thickness in the Z-axis direction. A display area AA on the display panel 100 includes a pixel array for displaying an input image thereon. The pixel array includes a plurality of data lines 102, a plurality of gate lines 103 intersecting a plurality of the data lines 102, and pixels 101 arranged in a matrix form. The display panel 100 may further include power lines commonly connected to the pixels 101. The power lines are connected to constant voltage nodes of the pixel circuits and supply a constant voltage necessary for driving the pixels 101 to the pixels 101.

Each of the pixels 101 may be divided into a red sub-pixel, a green sub-pixel, and a blue sub-pixel for color implementation. Each of the pixels may further include a white sub-pixel. Each of the sub-pixels includes a pixel circuit for controlling a light-emitting element. Each of the pixel circuits is connected to data lines, gate lines, and power lines.

The pixels may be disposed as real color pixels and pentile pixels. A pentile pixel may realize a higher resolution than the real color pixel by driving two sub-pixels having different colors as one pixel 101 through the use of a preset pixel rendering algorithm. Pixel rendering algorithms may compensate for insufficient color representation in each pixel with the color of light emitted from an adjacent pixel.

The pixel array includes a plurality of pixel lines LI to Ln. Each of the pixel lines LI to Ln includes one line of pixels arranged along the line direction (X-axis direction) in the pixel array of the display panel 100. Sub-pixels arranged in one pixel line share the gate lines 103. Sub-pixels arranged in the column direction Y along a data line direction share the same data line 102. One horizontal period is a time obtained by dividing one frame period by the total number of the pixel lines LI to Ln.

The display panel 100 may be implemented as a non-transmissive display panel or a transmissive display panel. The transmissive display panel may be applied to a transparent display device in which an image is displayed on a screen and an actual background is visible. The display panel 100 may be manufactured as a flexible display panel.

The cross-sectional structure of the display panel 100 may include a circuit layer CIR, a light-emitting element layer EMIL, and an encapsulation layer ENC stacked on a substrate SUBS, as shown in FIG. 2.

The circuit layer CIR may include a TFT array including a pixel circuit connected to electrical lines such as a data line, a gate line, a power line, and the like, a demultiplexer array 112, and a gate driver 120. The circuit layer CIR includes a plurality of metal layers insulated with insulating layers interposed therebetween, and a semiconductor material layer.

The light-emitting element layer EMIL may include a light-emitting element driven by the pixel circuit. The light-emitting element may include a light-emitting element of a red sub-pixel, a light-emitting element of a green sub-pixel, and a light-emitting element of a blue sub-pixel. The light-emitting element layer EMIL may further include a light-emitting element of white sub-pixel. The light-emitting element layer EMIL corresponding to each of the sub-pixels may have a structure in which a light-emitting element and a color filter are stacked. The light-emitting elements EL in the light-emitting element layer EMIL may be covered by multiple protective layers including an organic film and an inorganic film.

The encapsulation layer ENC covers the light-emitting element layer EMIL to seal the circuit layer CIR and the light-emitting element layer EMIL. The encapsulation layer ENC may also have a multi-insulating film structure in which an organic film and an inorganic film are alternately stacked. The inorganic film blocks permeation of moisture and oxygen. The organic film planarizes the surface of the inorganic film. When the organic layer and the inorganic layer are stacked in multiple layers, the movement of moisture and oxygen is impeded as compared to a single layer, so that penetration of moisture and oxygen affecting the light-emitting element layer EMIL may be effectively blocked.

A touch sensor layer (not shown) may be formed on the encapsulation layer ENC, and a polarizing plate or a color filter layer may be disposed thereon. The touch sensor layer may include capacitive touch sensors that sense a touch input based on a change in capacitance before and after the touch input. The touch sensor layer may have metal wiring patterns and insulating films that form the capacitance of the touch sensors. The insulating films may insulate an area where the metal wiring patterns intersect and may planarize the surface of the touch sensor layer. The polarizing plate may improve visibility and contrast ratio by converting the polarization of external light reflected by metal in the touch sensor layer and the circuit layer. The polarizing plate may be implemented as a circular polarizing plate or a polarizing plate in which a linear polarizing plate and a phase retardation film are bonded together. A cover glass may be adhered to the polarizing plate. The color filter layer may include red, green, and blue color filters. The color filter layer may further include a black matrix pattern. The color filter layer may replace the polarizing plate by absorbing a part of the wavelength of light reflected from the circuit layer and the touch sensor layer and increase the color purity of an image reproduced in the pixel array.

The power circuit 140 generates a direct current (DC) voltage (or a constant voltage) for driving the pixel array of the display panel 100 and the display panel driving circuit using a DC-DC converter. The DC-DC converter may include a charge pump, a regulator, a buck converter, a boost converter, and the like. The power circuit 140 may adjust the level of a DC input voltage applied from the host system 200 to generate constant voltage such as a gamma reference voltage VGMA, a gate-on voltage VGL, a gate-off voltage VGH, a pixel driving voltage ELVDD, a pixel reference voltage ELVSS, an initialization voltage Vini, and the like.

The gamma reference voltage VGMA is supplied to the data driver 110. The dynamic range of the data voltage outputted from the data driver 110 is determined by the voltage range of the gamma reference voltage. The dynamic range of the data voltage is a voltage range between the highest grayscale voltage and the lowest grayscale voltage, and the voltage level is selected by the grayscale value of the pixel data. The voltage level outputted from the power circuit 140 may be controlled by a control circuit such as the host system 200 or the timing controller 130. Hereinafter, the control circuit may be the host system 200 and/or the timing controller 130.

The gate-on voltage VGL and the gate-off voltage VGH are supplied to a level shifter 150 and the gate driver 120. The constant voltages such as the pixel driving voltage ELVDD, the pixel reference voltage ELVSS and the initialization voltage Vini are supplied to the pixels 101 through the power lines commonly connected to the pixels 101.

The pixel driving voltage ELVDD may be output from a main power source of the host system 200 and supplied to the display panel 100. In this case, the pixel driving voltage ELVDD does not need to be outputted from the power circuit 140.

The display panel driving circuit writes pixel data of an input image to the pixels of the display panel 100 based on the control of the timing controller 130. The display panel driving circuit includes the data driver 110 and the gate driver 120. The display panel driving circuit may further include a demultiplexer array 112 disposed between the data driver 110 and the data lines 102.

The demultiplexer array 112 sequentially supplies the data voltages outputted from channels of the data driver 110 to the data lines 102 using a plurality of demultiplexers DEMUX. The demultiplexer may include a multiple of switch elements disposed on the display panel 100. When the demultiplexer is disposed between the output terminals of the data driver 110 and the data lines 102, the number of channels of the data driver 110 may be reduced. The demultiplexer array 112 may be omitted.

The display panel driving circuit may further include a touch sensor driver for driving touch sensors. The touch sensor driver is omitted from FIG. 1. The data driver 110 and the touch sensor driver may be integrated into single drive integrated circuit (IC). In a mobile terminal or a wearable terminal, the timing controller 130, the level shifter 150, the data driver 110, the touch sensor driver, and the like may be integrated into a single DIC as shown in FIG. 3.

The data driver 110 receives pixel data of an input image, which is received as a digital signal from the timing controller 130, and outputs a data voltage. The data driver 110 converts the pixel data of an input image into a gamma compensation voltage and outputs the data voltage at each frame period in a normal driving mode using a digital-to-analogue converter (DAC). The gamma reference voltage VGMA is divided by a voltage divider circuit into a gamma compensation voltage for each grayscale. The gamma compensation voltage for each grayscale is provided to the DAC in the data driver 110. The data voltage is outputted via an output buffer from each of the channels of the data driver 110.

The gate driver 120 may be formed in the circuit layer CIR on the display panel 100 together with the TFT array of the pixel array and the wirings. The gate driver 120 may be disposed in a bezel BZ, which is non-display region of the display panel 100 or may be distributed and disposed in a pixel array in which an input image is reproduced.

The gate driver 120 may be disposed in the bezel BZ on opposite sides of the display panel 100 with the display area of the display panel interposed therebetween and may supply gate pulses from the opposite sides of the gate lines 103 in a double feeding method. In another aspect, the gate driver 120 may be disposed on either the left or right bezel of the display panel 100 to supply gate signals to the gate lines GL in a single feeding method. The gate driver 120 sequentially outputs pulses of the gate signals to the gate lines 103 based on the control of the timing controller 130. The gate driver 120 may sequentially supply the gate signals to the gate lines 103 by time shifting pulses of the gate signals using a shift register.

The gate driver 120 may include a plurality of shift registers that output pulses of the gate signals. In the case of the pixel circuit shown in FIG. 5, the gate driver 120 may include a first gate driver 121 which sequentially outputs scan signals [SCAN(N−1) and SCAN(N)] synchronized with the data voltage of pixel data, and a second gate driver 122 which sequentially outputs an emission control signal [EM(N)] (hereinafter, referred to as "EM signal"). The scan signals [SCAN(N−1) and SCAN(N)] are applied to scan lines among the gate lines 103. The EM signal is applied to emission control lines among the gate lines 103. In the case of the pixel circuit in FIG. 5, first and second gate lines GL1 and GL2 are scan lines, and third gate line GL3 is an emission control line. The first and second gate drivers 121 and 122 output the scan signals [SCAN(N−1) and SCAN (N)] and the EM signal [EM(N)] during a refresh frame or a refresh period based on the control of the timing controller 130. During a period of a skip frame or a skip period, the first gate driver 121 may not generate an output and the second gate driver 122 may output the EM signal [EM(N)].

The timing controller 130 receives digital video data of an input image and timing signals synchronized with this data from the host system 200. The timing signals may include a vertical synchronization signal Vsync, a horizontal synchronization signal Hsync, a clock CLK, and a data enable signal DE. In some cases, a vertical period and a horizontal period may be known by counting the data enable signal DE, the vertical synchronization signal Vsync and the horizontal synchronization signal Hsync may be omitted. The data enable signal DE has a cycle of one horizontal period (1H).

The timing controller 130 generates a data timing control signal for controlling the operation timing of the data driver 110 based on the timing signals Vsync, Hsync, and DE received from the host system 200, a control signal for controlling the operation timing of the demultiplexer array 112, and a gate timing control signal for controlling the operation timing of the gate driver 120. The timing controller 130 synchronizes the data driver 110, the demultiplexer array 112, the touch sensor driver, and the gate driver 120 by controlling the operation timings of the display panel driving circuit.

The gate timing control signal generated from the timing controller 130 may be input into the shift registers of the gate driver 120 through the level shifter 150. The level shifter 150 may receive the gate timing control signal and generate a start pulse and a shift clock to provide them to the gate driver 120.

The host system 200 may include a main board of any one of a television (TV) system, a set-top box, a navigation system, a personal computer (PC), a vehicle system, a mobile terminal, and a wearable terminal. The host system may scale an image signal from a video source to match the resolution of the display panel 100 and may transmit the scaled image signal to the timing controller 130 together with the timing signal.

In the mobile terminal and the wearable terminal, the host system 200 may be implemented by an application processor (AP). The host system 200 may transmit pixel data of an input image to the DIC through a Mobile Industry Processor Interface (MIPI). The host system 200 may be connected to the DIC via a flexible printed circuit, for example, a flexible printed circuit (FPC), as shown in FIG. 3. The drive IC may be attached to the display panel 100 in a chip on glass (COG) process.

Figure 4:
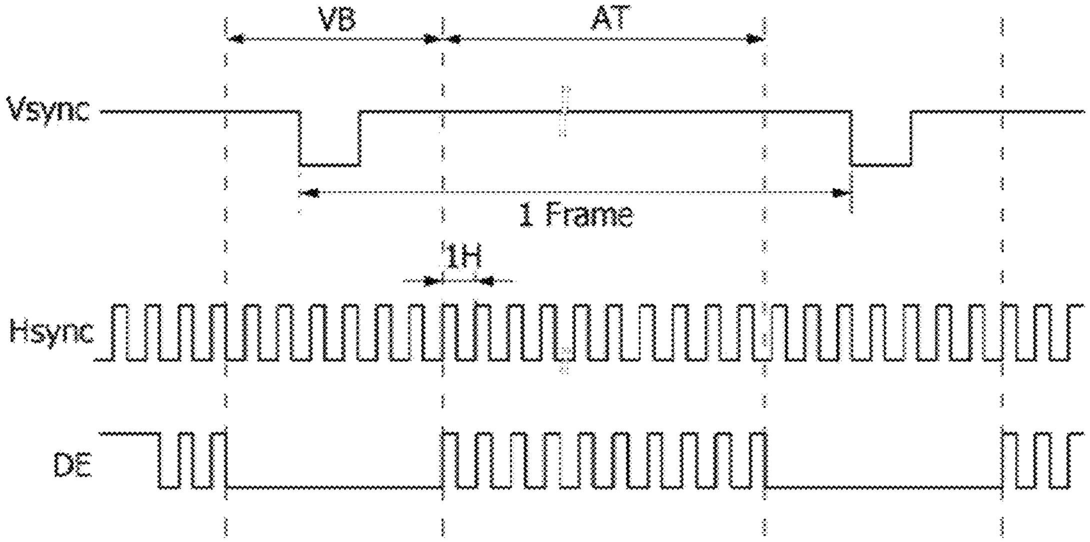
FIG. 4 shows one frame period and one horizontal period.

FIG. 4 shows one frame period and one horizontal period.

Referring to FIG. 4, the vertical synchronization signal Vsync, the horizontal synchronization signal Hsync, and the data enable signal DE are timing signals synchronized with pixel data of an input image.

The vertical synchronization signal Vsync may be one frame period. The horizontal synchronization signal Hsync may be one horizontal period 1H. The data enable signal DE may be an effective data section including pixel data to be written to the pixels. A pulse of the data enable signal DE is synchronized with the pixel data to be written to the pixels of the display panel 100. One pulse period of the data enable signal DE is one horizontal period 1H.

One frame period is divided into an active interval AT during which the pixel data of the input image is written to the pixels, and a vertical blank period VB having no pixel data. The vertical blank period VB is a blank period between an active interval AT of an (M−1)th (M being a natural number) frame period and an active interval AT of an Mth frame period, and pixel data is not received by the timing controller 130 and the data driver 110 during the blank period. The active interval AT includes pixel data to be written in sub-pixels of all pixel lines LI to Ln of the display panel 100.

The pixel circuit for each of the sub-pixels includes a light-emitting element, a driving element that generates a current according to a gate-source voltage Vgs to drive the light-emitting element, and a capacitor that maintains the gate-source voltage of the driving element. The driving element may be implemented as a transistor. To make the image quality of the entire screen of the organic light-emitting display device uniform, it is preferable that the driving element has uniform electrical characteristics among all pixels. However, due to device characteristic deviations and process deviations caused by the manufacturing process of the display panel 100, there may be a difference in the electrical characteristics of the driving element for each pixel, and these differences in electrical characteristics may increase as the driving time of the pixels elapses. Internal compensation technologies and/or external compensation technologies may be used to compensate for the deviations in the electrical characteristic and the variations of the driving element between the pixels. In the internal compensation technologies, a threshold voltage of a driving element is sensed for each sub-pixel and a data voltage is compensated by the threshold voltage using a pixel circuit including an internal compensation circuit.

Figure 5:
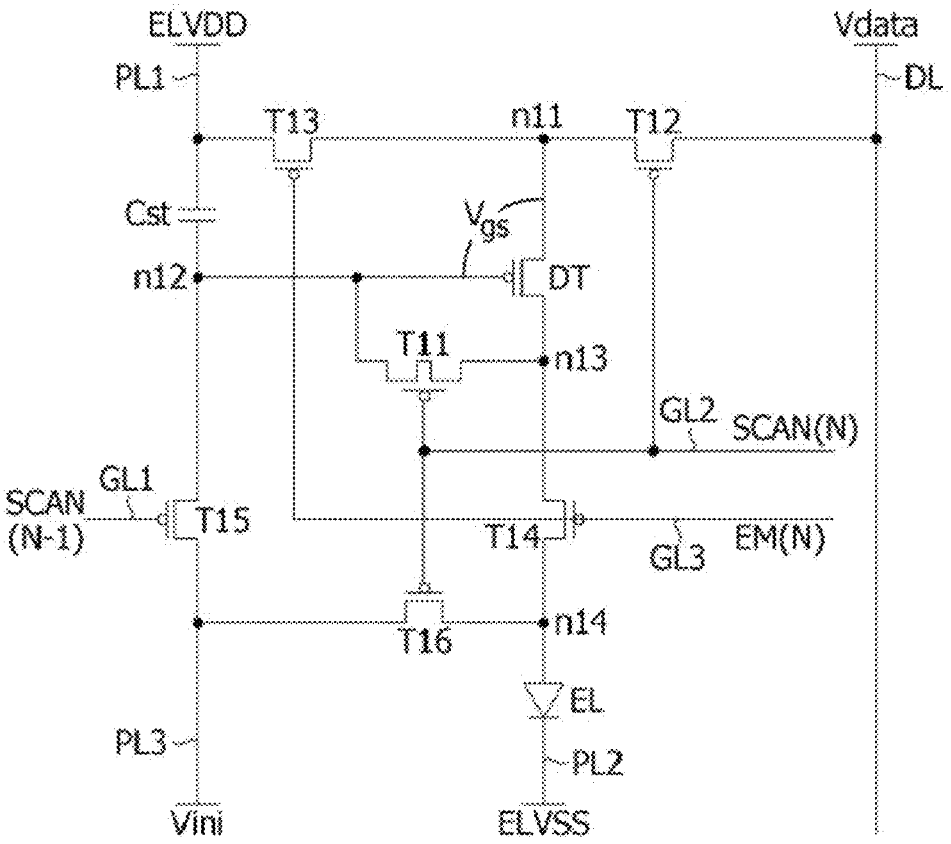
FIG. 5 is a circuit diagram illustrating a pixel circuit in accordance with some aspects of the present disclosure.

FIG. 5 is a circuit diagram illustrating a pixel circuit according to one aspect of the present disclosure. The pixel circuit shown in FIG. 5 is an example of any sub-pixel circuit belonging to the Nth (where N is a positive integer greater than or equal to 2) pixel line. The pixel circuit includes an internal compensation circuit that senses a threshold voltage Vth of a driving element DT and compensates a data voltage Vdata by the threshold voltage Vth.

Referring to FIG. 5, the pixel circuit includes a light-emitting element EL, a driving element DT for driving the light-emitting element EL, a plurality of switch elements T11 to T16, and a capacitor Cst. The driving element DT and the switch elements T11 to T16 may be implemented as, but not limited to, p-channel transistors.

The pixel circuit is connected to a data line DL through which the data voltage Vdata is applied and gate lines through which gate signals [SCAN(N−1), SCAN(N), SENSE(N), and EM(N)] are applied.

The pixel circuit is connected to power nodes to which DC voltages (or constant voltages) are applied, such as a first constant voltage node PL1 to which the pixel driving voltage ELVDD is applied, a second constant voltage node PL2 to which the pixel reference voltage ELVSS is applied, and a third constant voltage node PL3 to which the initialization voltage Vini is applied. The power lines to which the constant voltage nodes are connected on the display panel may be commonly connected to all pixels.

A default voltage level of the pixel driving voltage ELVDD is set to a voltage higher than the maximum voltage of the data voltage Vdata to operate the driving element DT in a saturation region. A voltage level of the pixel driving voltage ELVDD may be lowered for at least some periods in the low power mode. The initialization voltage Vini may be set to a voltage lower than the pixel driving voltage ELVDD and equal to or higher than the pixel reference voltage ELVSS. The gate-off voltage VGH may be set to a voltage higher than the pixel driving voltage ELVDD, and the gate-on voltages VGL may be set to a voltage lower than the pixel reference voltage ELVSS.

The gate signals [SCAN(N−1), SCAN(N), and EM(N)] include pulses that alternate between the gate-on voltage VGL and the gate-off voltage VGH. The scan signals [SCAN(N−1) and SCAN(N)] include an (N−1)th scan signal SCAN(N−1) and an Nth scan signal SCAN(N) that are sequentially shifted by a first shift register. The EM signal is sequentially shifted by a second shift register.

The pixel circuit may be driven in the order of an initialization period INI, a sensing period SEN, and an emission period EMIS, as shown in FIGS. 6A, 6B, 7A, 7B, 8A, and 8B. The initialization period INI, the sensing period SEN, and the emission period EMIS may be determined by waveforms of the gate signals [SCAN(N−1), SCAN(N), and EM(N)].

A pulse of the (N−1)th scan signal SCAN(N−1) may define the sensing period SEN of an (N−1)th pixel line and define the initialization period INI of an Nth pixel line. A pulse of the Nth scan signal SCAN(N) may define the sensing period SEN of an Nth pixel line and define the initialization period INI of an (N+1)th pixel line. Pulses of the (N−1)th scan signal SCAN(N−1) and the Nth scan signal SCAN(N) are generated as the gate-on voltage VGL and have a pulse width of one horizontal period (1H). A section of the gate-on voltage of the EM signal [EM(N)] may define the emission period EMIS. A pulse of the EM signal [EM(N)] is generated as the gate-off voltage VGH during the initialization period INI and the sensing period SEN and has a pulse width of two or more horizontal periods.

The driving element DT generates a current according to the gate-source voltage Vgs to drive the light-emitting element EL. The driving element DT includes a first electrode connected to a first node n11, a gate electrode connected to a second node n12, and a second electrode connected to a third node n13.

The light-emitting element EL may be implemented with an organic light emitting diode (OLED).

The capacitor Cst is connected between the first constant voltage node PL1 and the second node n12. The pixel driving voltage ELVDD is supplied to all pixels through a power line connected to the first constant voltage node PL1.

A first switch element T11 is turned on according to the gate-on voltage VGL of the Nth scan signal SCAN (N) to connect a gate electrode and a second electrode of the driving element DT. The first switch element T11 includes a first electrode connected to the second node n12, a gate electrode connected to the second node GL2 to which the Nth scan signal SCAN (N) is applied, and a second electrode connected to the third node n13. The first switch element T11 is turned on only for one horizontal period (1H) in which the Nth scan signal SCAN (N) is generated as the gate-on voltage VGL in one frame period and may be held in an off state for the remaining frame period except for the one horizontal period (1H), thereby causing a leakage current to be generated. The first switch element T11 may be implemented as, but not limited to, a transistor having a dual gate structure to reduce the leakage current.

A second switch element T12 is turned on according to the gate-on voltage VGL of the Nth scan signal [SCAN(N)] to apply the data voltage Vdata to the first electrode of the driving element DT. The second switch element T12 includes a first electrode connected to the first node n11, a gate electrode connected to the second node GL2, and a second electrode connected to the data line DL.

A third switch element T13 is turned on according to the gate-on voltage VGL of the EM signal [EM(N)] to supply the pixel driving voltage ELVDD to the first electrode of the driving element DT. The third switch element T13 includes a first electrode connected to the first constant voltage node PL1, a gate electrode connected to the third gate line GL3 to which the EM signal [EM(N)] is applied, and a second electrode connected to the first node n11.

A fourth switch element T14 is turned on based on a gate-on voltage VGL of an EM signal [EM(N)] to connect the second electrode of the driving element DT to an anode electrode of the light-emitting element EL. A gate electrode of the fourth switch element T14 is connected to the third gate line GL3 to which the EM signal [EM(N)] is applied. A first electrode of the fourth switch element T14 is connected to the third node n13, and a second electrode of the fourth switch element T14 is connected to a fourth node n14.

A fifth switch element T15 is turned on based on the gate-on voltage VGL of the (N−1)th scan pulse [SCAN(N−1)] to connect the second node n12 to the third constant voltage node PL3. The fifth switch element T15 includes a first electrode connected to the second node n12, a gate electrode connected to the first gate line GL1 to which the (N−1)th scan signal [SCAN(N−1)] is applied, and a second electrode connected to the third constant voltage node PL3.

A sixth switch element T16 is turned on based on the gate-on voltage VGL of the Nth scan signal [SCAN(N)] to connect the third constant voltage node PL3 to the anode electrode of the light-emitting element EL. The sixth switch element T16 includes a first electrode connected to the third constant voltage node PL3, a gate electrode connected to the second gate line GL2 to which the Nth scan signal [SCAN (N)] is applied, and a second electrode connected to the fourth node n14.

Figure 6A:
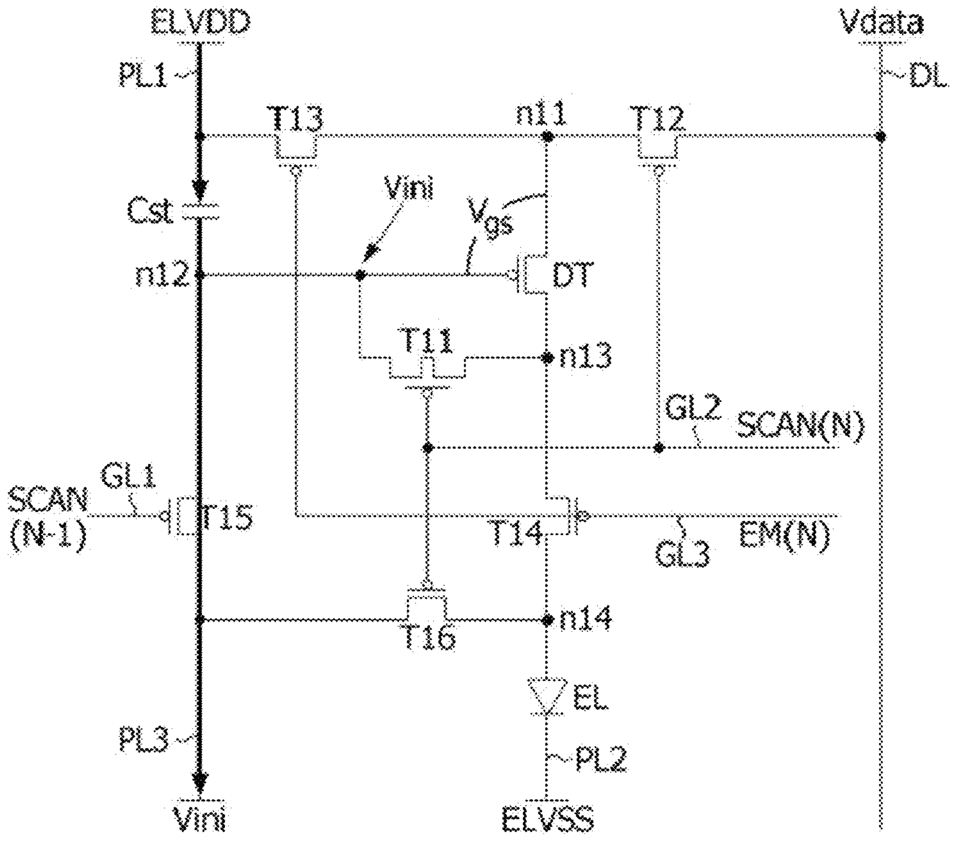
FIGS. 6A, 6B, 7A, 7B, 8A, and 8B are diagrams which illustrate internal compensation shown in FIG. 5 in accordance with some aspects of the disclosure.
Figure 6B:
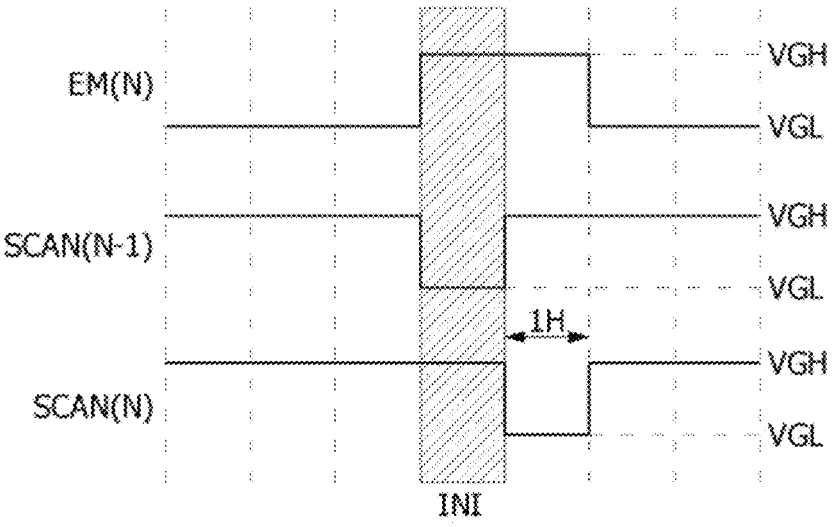
Figure 7A:
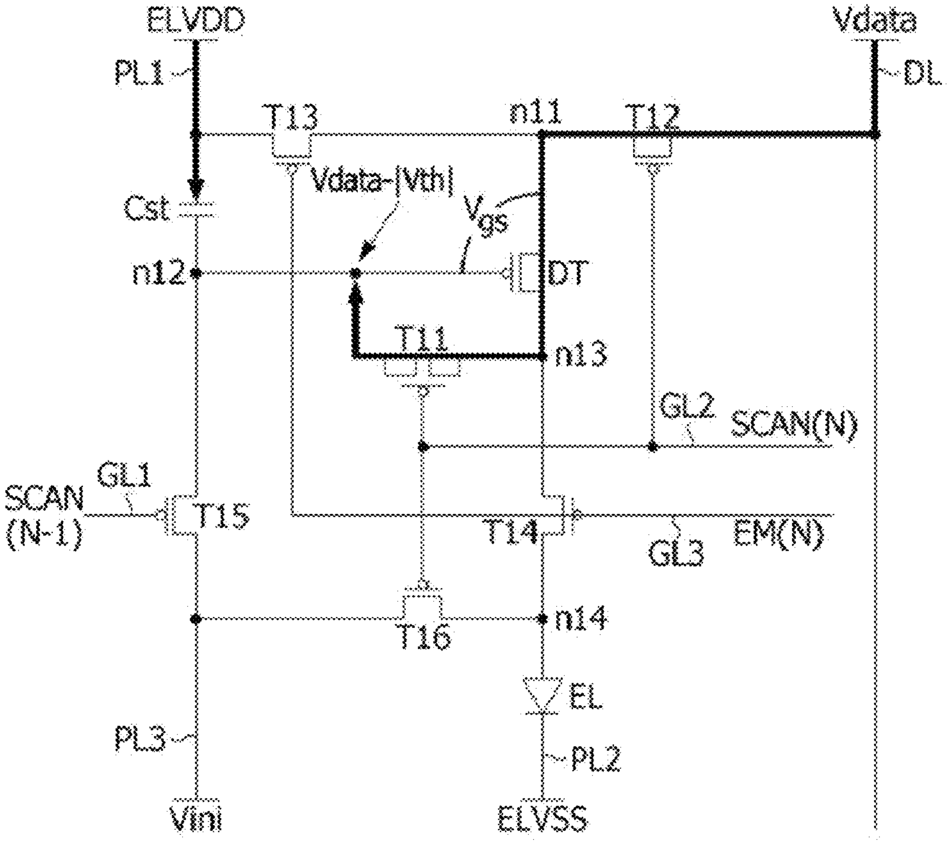
Figure 7B:
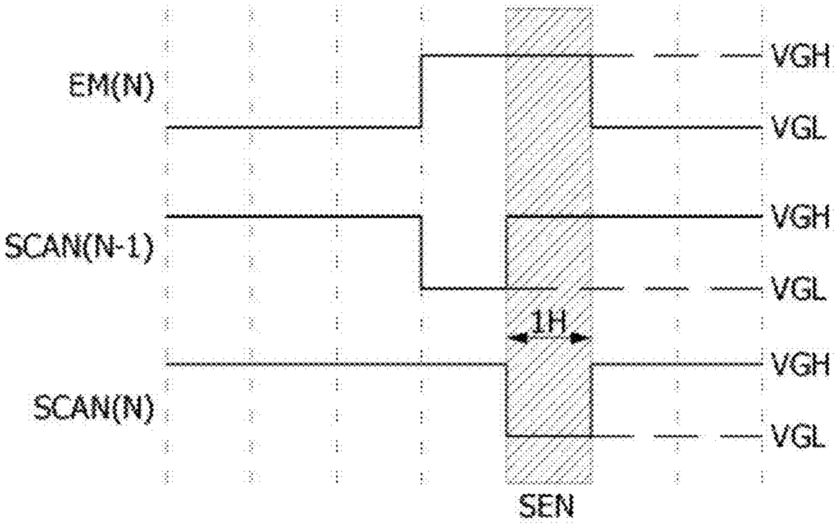
Figure 8A:
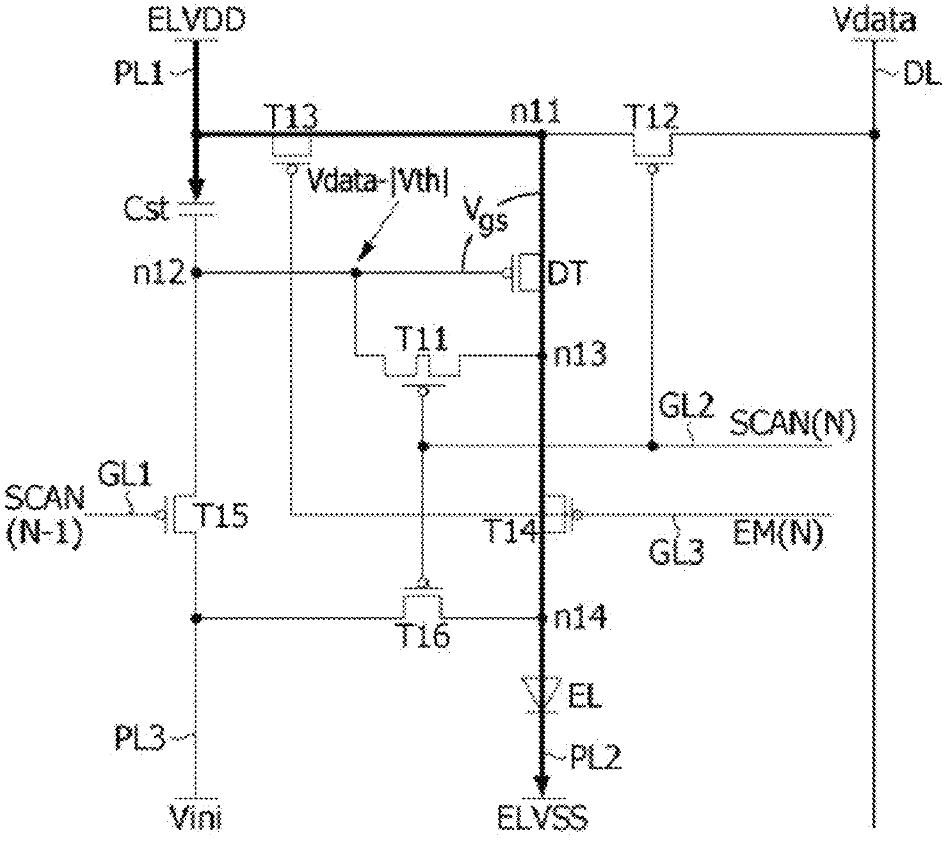
Figure 8B:
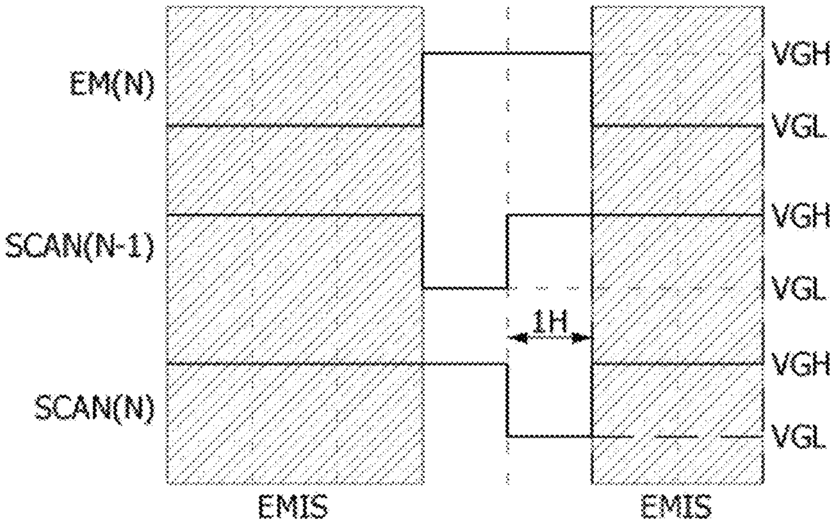

FIGS. 6A to 8B are diagrams which illustrate the internal compensation shown in FIG. 5 in stages. FIG. 6A is a diagram illustrating a current path flowing through a pixel circuit in an initialization period INI. FIG. 7A is a diagram illustrating a current path flowing through a pixel circuit during a sensing period SEN. FIG. 8A is a diagram illustrating a current path flowing through a pixel circuit during an emission period EMIS. FIGS. 6B, 7B, and 8B are waveform diagrams showing the gate signals [SCAN(N−1), SCAN(N), and EM(N)].

FIGS. 6A and 6B illustrate operation during the initialization voltage Vini. In this case, the voltage of the (N−1)th scan signal [SCAN(N−1)] is the gate-on voltage VGL in the initialization period INI. The fifth switch element T15 is turned on during the initialization period INI, and the voltage of the second node n12 is discharged to the initialization voltage Vini. As a result, the gate voltage of the driving element DT is initialized to the initialization voltage Vini in the initialization period INI.

FIGS. 7A and 7B illustrate operation during the sensing period SEN. In this case, the voltage of the Nth scan signal [SCAN(N)] is the gate-on voltage VGL in the sensing period SEN. The first, second, and sixth switch elements T11, T12, and T16 are turned on during the sensing period SEN. In this case, the data voltage Vdata is applied to the second node n12, and the voltage of the second node n12 is changed from Vini to Vdata−|Vth|. As a result, the capacitor Cst is charged with the data voltage Vdata, which is compensated by the threshold voltage Vth of the driving element DT sensed during the sensing period SEN.

FIGS. 8A and 8B illustrate operation during in the emission period EMIS. In this case, the voltage of the EM signal [EM(N)] is the gate-on voltage VGL in the emission period EMIS. The third and fourth switch elements T13 and T14 are turned on during the emission period EMIS. During the emission period EMIS, the driving element DT generates a current according to the gate-source voltage Vgs. The light-emitting element EL may be driven by the current supplied through the driving element DT to emit light with a brightness corresponding to a grayscale value of pixel data.

The current flowing through the light-emitting element EL is adjusted by the gate-source voltage Vgs of the driving element DT. The gate-source voltage Vgs of the driving element DT is Vgs=Vdata−|Vth|−VDD during the emission period EMIS. To accurately express the luminance of the low grayscale, the EM signal [EM (N)] may alternate between the gate-on voltage VGL and the gate-off voltage VGH at a predetermined duty ratio during the emission period EMIS.

Figure 9:
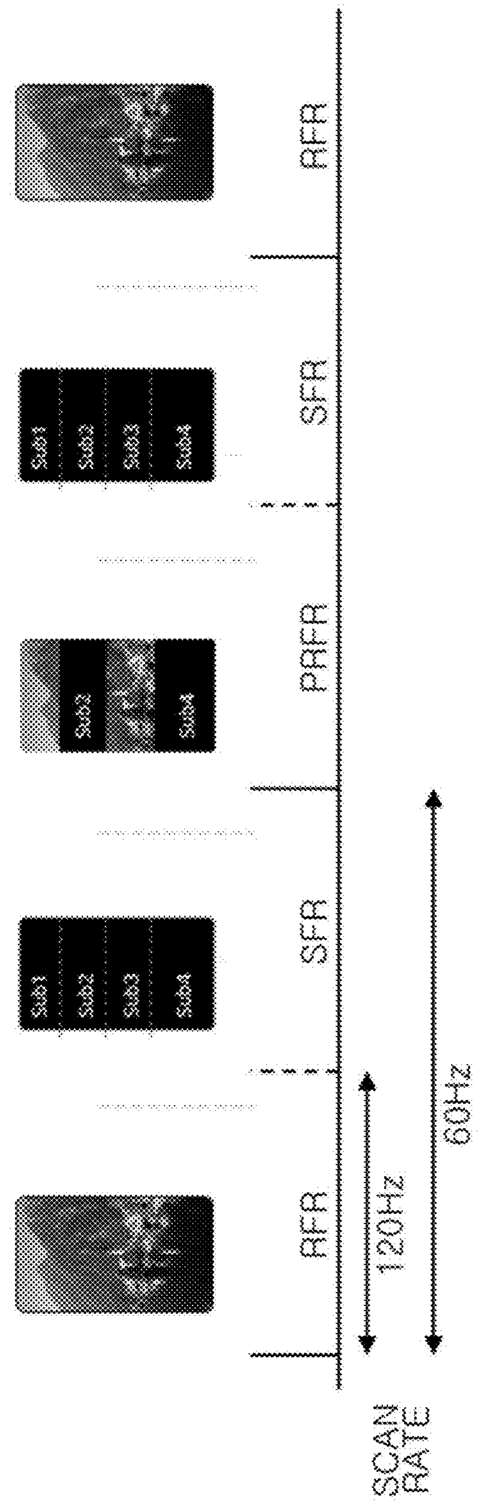
FIG. 9 shows a refresh frame, a skip frame, and a partial refresh frame at a scan rate in a low power mode in accordance with some aspects of the disclosure.

The display device of the present disclosure supports variable scan rates to reduce power consumption. A variable scan rate may be controlled by the host system 200 or the timing controller 130. The display panel driving circuit scans pixels during a refresh frame RFR in a normal driving mode and a low power mode and writes pixel data into the pixels as shown in FIG. 9. The pixel data is written to the pixels in a pixel line scanned in a refresh frame RFR and a partial refresh frame PRFR.

In the low power mode, the host system 200 or the timing controller 130 may control at least one of the frame periods as a period of a skip frame SFR depending on the scan rate. When an input image does not change or is a still image, the pixels may be driven in the low power mode to maintain the previous data voltage to emit light.

Most of the display panel driving circuits are disabled in the skip frame SFR under the control of the timing controller 130 and are not driven without receiving power. In the skip frame SFR, a second shift register of the gate driver 120 may output the EM signal [EM(N)] based on the control of the timing controller 130 to maintain the light emission of the pixels.

Since no gate signal and data voltage are applied to the pixels in the skip frame SFR, no new pixel data is written to the pixels and the data voltage of the previous pixel data is maintained. The data voltage of the previous pixel data is the data voltage charged in the pixels in the previous refresh frame RFR or the previous partial refresh frame PRFR. In the SFR, power consumption of the display panel 100 and the display panel driving circuit may be reduced.

The timing controller 130 may vary the refresh frame frequency between 1 Hz and 120 Hz to support a variable scan rate function. The scan rate, that is, the refresh frame frequency, in the normal driving mode, may be set to a frequency greater than or equal to 60 Hz, for example, any one of 60 Hz, 120 Hz, and 144 Hz. The scan rate in the low power mode is lower than the refresh frame frequency in the normal drive mode. For example, the scan rate may be lowered to 1 Hz in the low power mode. When the scan rate is 1 Hz, only one frame among 60) frames per second is a refresh frame RFR or partial refresh frame PRFR, and the remaining 59 frames are skip frames SFR.

When the scan rate in the low power mode is lowered, the average voltage of the pixel driving voltage ELVDD may be lowered during the periods of the skip frame and the partial refresh frame, as may be seen in the following embodiments.

FIG. 9 shows a refresh frame, a skip frame, and a partial refresh frame at a scan rate in a low power mode in accordance with some aspects of the disclosure.

Referring to FIG. 9, the display area AA of the display panel 100 may be divided into four sub-areas Sub1 to Sub4 and driven. The sub-areas Sub1 to Sub4 refer to divided driving areas, and are divided into refresh areas, in which pixels in the PRFR are scanned, and skip areas, in which the pixels maintain a previous data voltage, without physically dividing the display panel 100. Each of the sub-areas Sub1 to Sub4 includes a plurality of pixel lines. The timing controller 130 may control each of the sub-areas Sub1 to Sub4 as the refresh areas or the skip area.

During a period of the refresh frame RFR, the gate signals [SCAN(N−1), SCAN(N), and EM(N)] and the data voltage Vdata are applied to all pixel lines in the display area AA. Accordingly, all pixels in the display area AA are scanned during the period of the refresh frame RFR, and the pixel data entered into a current frame is written to all pixels.

During a period of the skip frame SFR, the scan signals [SCAN(N−1) and SCAN(N)] and the data voltage Vdata are not applied to all of the pixel lines. During the period of the skip frame SFR, the pulse of the EM signal [EM(N)] is sequentially applied to the pixel lines, causing the pixels to emit light. Accordingly, during the period of the skip frame SFR, the pixels maintain the previous data voltage charged in the capacitor Cst and are not scanned. During the period of the skip frame SFR, the driving element DT supplies current to the light-emitting element EL based on the gate-source voltage Vgs charged in the capacitor Cst, allowing the pixels to maintain a light-emitting state.

The partial refresh frame PRFR includes one or more refresh periods during which pixel data of a current frame scans the sub-areas selected as the refresh areas, and one or more skip periods during which light emission is maintained without scanning the sub-areas selected as the skip areas.

During the refresh periods of the partial refresh frame PRFR, the gate signals [SCAN(N−1), SCAN(N), and EM(N)] and the data voltage Vdata are applied to the pixel lines in the refresh areas Sub1 and Sub3. Accordingly, the pixels in the refresh areas Sub1 and Sub3 of the partial refresh frame PRFR are scanned in a refresh period shorter than one frame period, and pixel data entered into a current frame is written to the pixels. During the skip periods of the partial refresh frame PRFR, the pixels in the non-scanned skip areas Sub2 and Sub4 may maintain previous data voltages and thus maintain the light-emitting state.

According to the present disclosure, in the low power mode, during the skip frame SFR, the pixel driving voltage ELVDD commonly applied to the pixels 101 may be appropriately lowered to increase the effect of reducing power consumption without deteriorating image quality. The luminance of the pixels not scanned in the skip frame SFR and the partial refresh frame does not vary greatly because the pixel driving voltage ELVDD does not affect the gate-source voltage of the driving element DT.

As may be seen from FIGS. 5, 6A, 6B, 7A, 7B, 8A, and 8B, when the gate signals [SCAN (N−1), SCAN (N), and EM (N)] are not applied to the pixel circuit, the pixel driving voltage ELVDD is not applied to the driving element DT. When the voltage of the first constant voltage node PL1 is changed while the second and fourth switch elements T12 and T3 are turned off, the voltage of the second node n12 is also changed by the same amount as the change through capacitor coupling, so that the voltage of the capacitor Cst, that is, the gate-source voltage Vgs of the driving element DT, does not change. For example, when the pixel driving voltage ELVDD is lowered from 5V to 4 V, the voltage of the second node n12 is lowered from 3V to 2V, and thus the gate-source voltage Vgs of the driving element DT is maintained at 2V.

Figure 10:
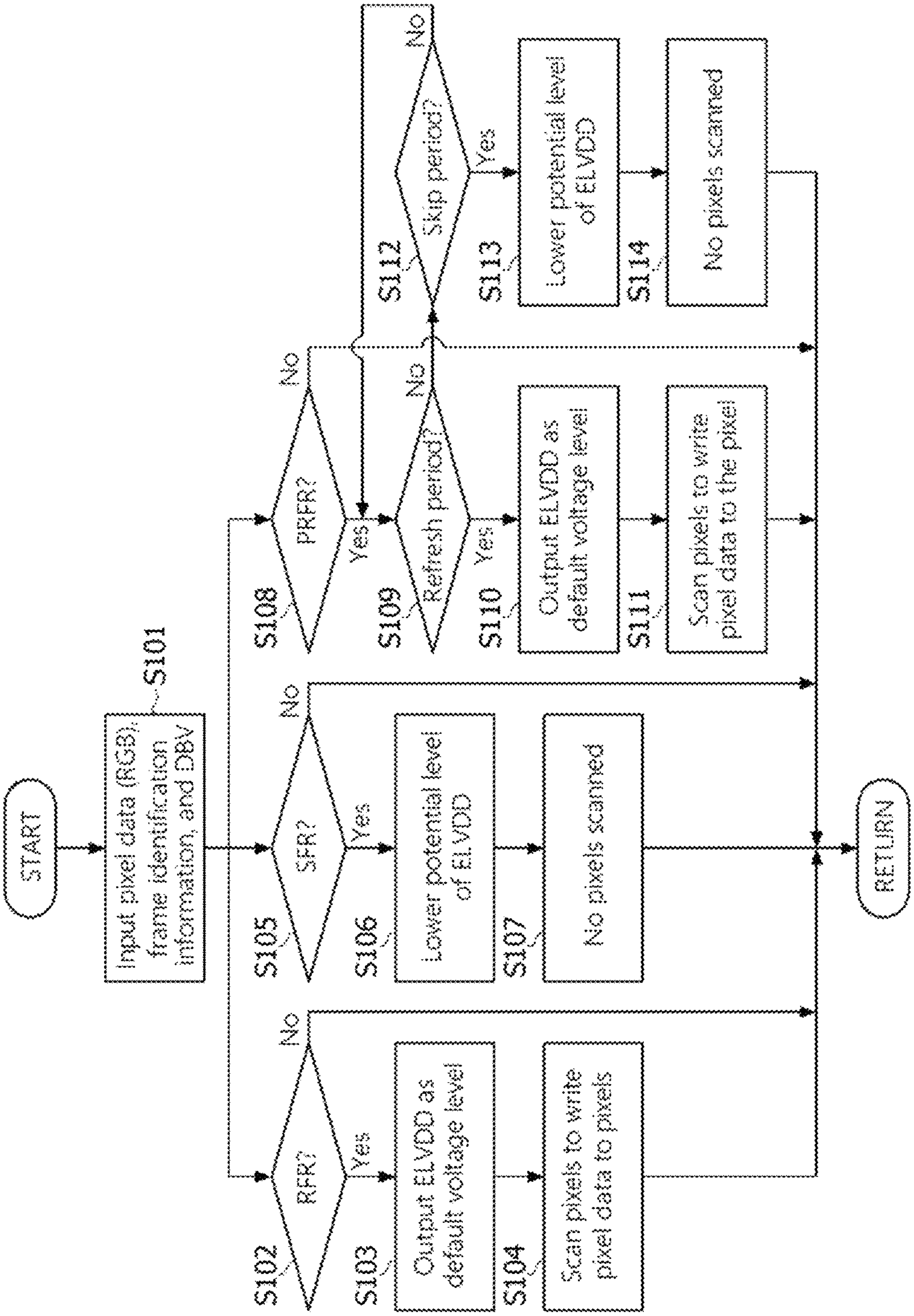
FIGS. 10 and 11 are diagrams illustrating a method of driving a display device according to a first aspect of the present disclosure.
Figure 11:
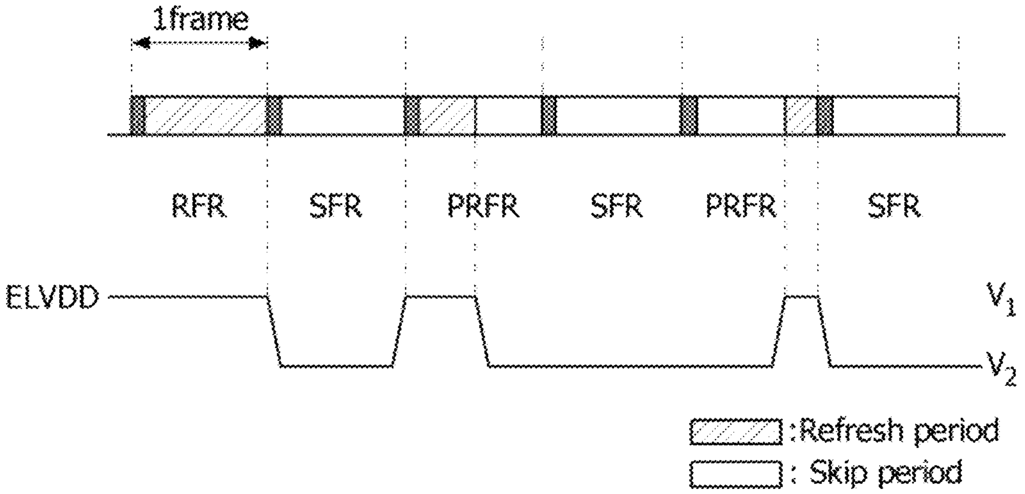

FIG. 10 is a flowchart illustrating a method of driving a display device according to a first aspect of the present disclosure. FIG. 11 is a diagram showing a method of controlling a pixel driving voltage ELVDD in the method of driving a display device according to the first aspect of the present disclosure.

Referring to FIGS. 10 and 11, the display device may receive pixel data RGB, frame identification information for a frame period, and display brightness value DBV information of an input image from the host system at block S101.

The frame identification information is digital data including identification codes indicative of a refresh frame PRFR, a skip frame SFR, and a partial refresh frame PRFR. The digital brightness value DBV limits the maximum brightness of the pixels. For example, the digital brightness value DBV may define or limit the maximum luminance of one frame in a display panel. When the digital brightness value DBV is lowered, the maximum brightness of pixels is decreased.

When a current frame period is the refresh frame RFR at block S102, the default voltage level $V_1$ of the pixel driving voltage ELVDD is supplied to the pixels at block S103. During the period of the refresh frame RFR, the display panel driving circuit scans the pixels by applying the data voltage Vdata of pixel data and the scan signals [SCAN(N−1) and SCAN(N)] to the pixels based on the control of the timing controller 130. As a result, the pixel data RGB of the input image is written to the pixels in the refresh frame RFR at block S104.

When a current frame period is the skip frame SFR at block S105, the power circuit 140 lowers the voltage level of the pixel driving voltage ELVDD. Accordingly, the pixel driving voltage ELVDD having the low potential level $V_2$ is supplied to the pixels during the skip frame SFR at block S106.

During the period of the skip frame SFR, the pixels are not scanned because the data voltage Vdata and the scan signals [SCAN(N−1) and SCAN(N)] are not applied to the pixels at block S107. Accordingly, no new pixel data is written to the pixels during the period of the skip frame SFR, and the pixels maintain previous data voltages that were charged during the refresh period of a previous refresh frame RFR or a previous partial refresh frame PRFR.

When a current frame period is the partial refresh frame PRFR at step S108, the voltage level of the pixel driving voltage ELVDD may be controlled to be different for each period corresponding to each of the sub-areas divided in the display area AA. The pixel driving voltage ELVDD is applied at a default voltage level $V_1$ during the refresh period during which the pixels in the refresh areas Sub1 and Sub3 are scanned at steps S109 and S110, and at a lower potential level $V_2$ lower than the default voltage level $V_1$ during the skip period during which the pixels in the skip areas Sub2 and Sub4 are skipped at blocks S112 and S113.

During the refresh period of the partial refresh frame PRFR, the display panel driving circuit scans the pixels disposed in the refresh areas Sub1 and Sub3 by applying the data voltage Vdata of pixel data and the scan signals [SCAN(N−1) and SCAN(N)] to the pixels under the control of the timing controller 130. As a result, the pixel data RGB of the input image is written to the pixels in the refresh areas Sub1 and Sub3 at block S111.

During the skip period of the partial refresh frame PRFR, the pixels in the skip areas Sub2 and Sub4 are not scanned and maintain the previous data voltage charged in the previous refresh frame RFR or the previous partial refresh frame PRFR at block S114.

Figure 12:
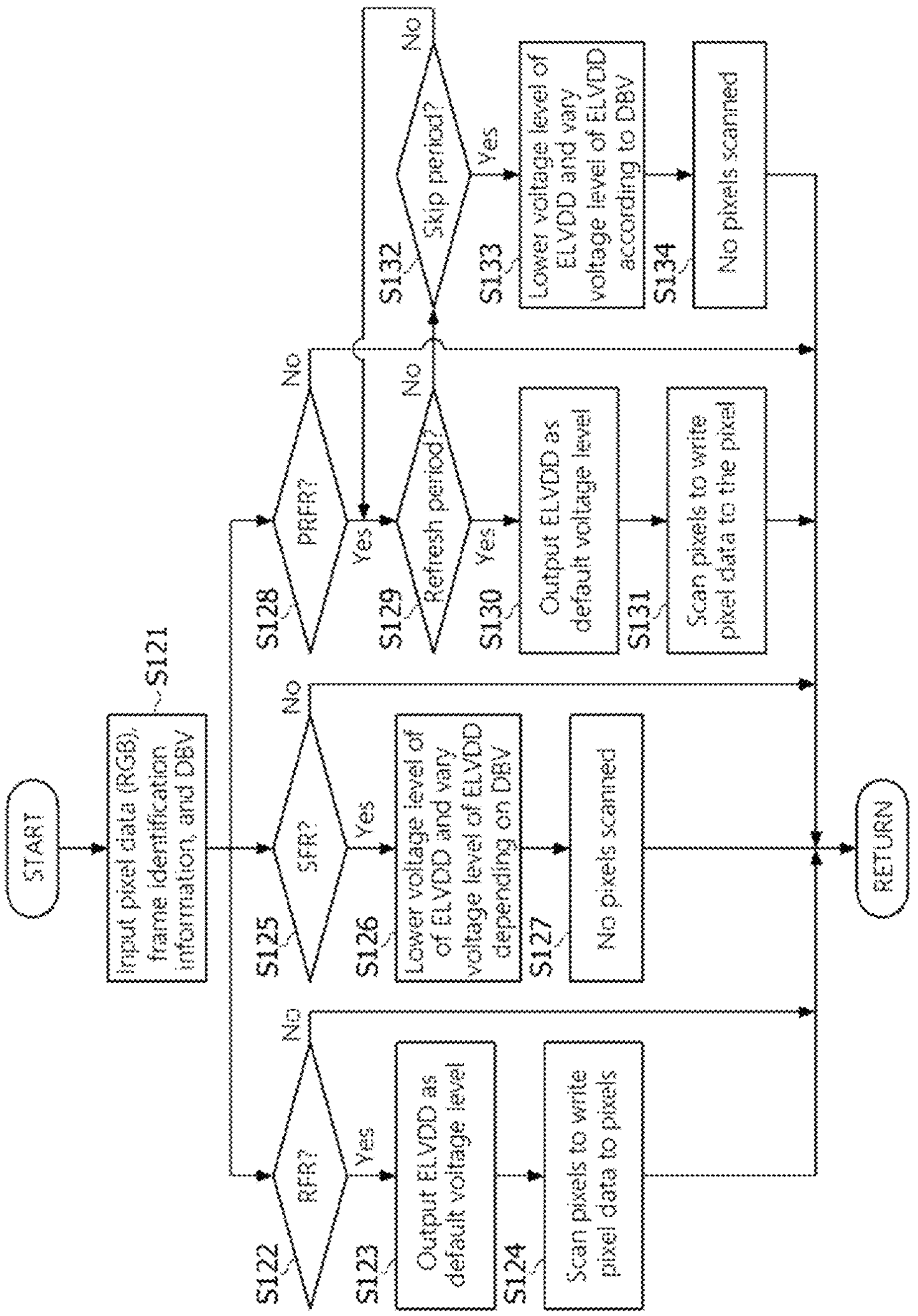
FIGS. 12 and 13 are diagrams illustrating a method of driving a display device according to a second aspect of the present disclosure.
Figure 13:
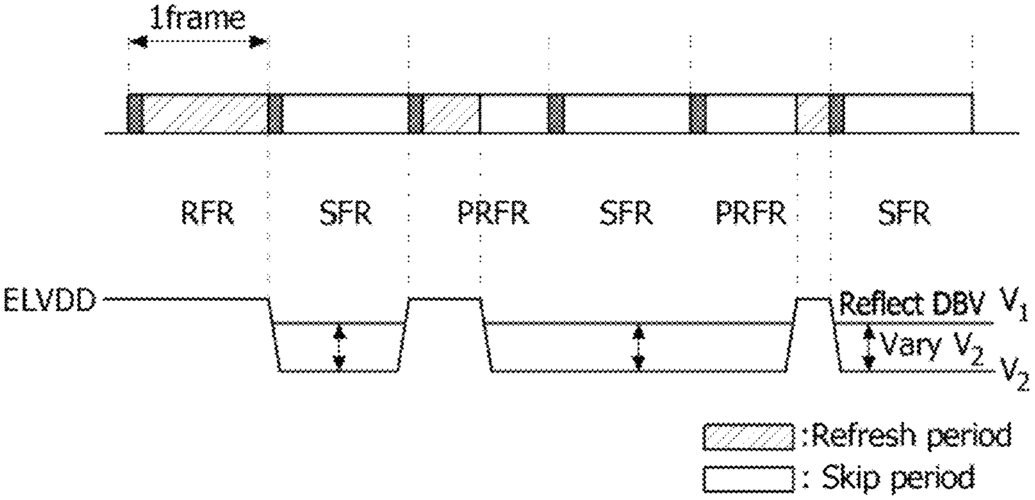

FIG. 12 is a flowchart illustrating a method of driving a display device according to a second aspect of the present disclosure. FIG. 13 is a diagram showing a method of controlling a pixel driving voltage ELVDD in the method of driving a display device according to the second aspect of the present disclosure. In this aspect, the pixel driving voltage ELVDD may be varied in association with the digital brightness value DBV during the period of the skip frame SFR and the skip period of the partial refresh frame PRFR. When the pixel driving voltage ELVDD is excessively lowered during the period of the skip frame SFR and the skip period of the partial refresh frame PRFR, the drain-source voltage Vds of the driving element DT is lowered, and thus the driving element DT may operate in a linear region rather than a saturated region. The digital brightness value DBV limits the maximum brightness of pixels. When the digital brightness value DBV is lowered, the maximum brightness of the pixels is lowered and the voltage level of the pixel driving voltage ELVDD, at which the transistor operates in the saturation region, is lowered due to the characteristics of the transistor. Accordingly, even if the voltage level of the driving voltage ELVDD is significantly lowered when the maximum brightness of the pixels is lowered, the driving element DT may operate in the saturation region.

Referring to FIGS. 12 and 13, the display device may receive the pixel data RGB, the frame identification information, and the digital brightness value DBV information of an input image from the host system at block S121.

When a current frame period is the refresh frame RFR at block S122, the default voltage level $V_1$ of the pixel driving voltage ELVDD is supplied to the pixels at block S123. During the period of the refresh frame RFR, the pixels are scanned and pixel data RGB of the input image is written to the pixels at block S124.

When a current frame period is the skip frame SFR at block S125, the power circuit 140 lowers the voltage level of the pixel driving voltage ELVDD. In this case, the power circuit may vary the voltage level of the pixel driving voltage ELVDD according to the digital brightness value DBV based on the control of the control circuit a block S126. For example, the power circuit 140 may lower the low potential level $V_2$ in proportion to the digital brightness value DBV during the skip frame SFR based on the control of the control circuit. For example, during the skip frame SFR, the power circuit 140 may lower the pixel driving voltage ELVDD to a first low potential level in response to a first digital brightness value and lower the pixel driving voltage ELVDD to a second low potential level lower than the first low potential level in response to a second digital brightness value lower than the first digital brightness value. Accordingly, the low potential level $V_2$ may be lowered when the digital brightness value DBV is lowered, while the low potential level $V_2$ may be increased when the digital brightness value DBV is increased. In this case, the low potential level $V_2$ of the pixel drive voltage ELVDD may be controlled such that the pixel drive voltage ELVDD increases to a voltage lower than the default voltage level $V_1$ even if the pixel drive voltage ELVDD rises. During the period of the skip frame SFR, the pixels are not scanned and maintain the previous data voltages at block S127.

When a current frame period is the partial refresh frame PRFR at block S128, the pixel driving voltage ELVDD may be controlled at different voltage levels for sub-areas divided in the display area AA. The pixel driving voltage ELVDD is applied at a default voltage level $V_1$ during the refresh period during which the pixels in the refresh areas Sub1 and Sub3 are scanned at blocks S129, 130, and S131 and at a low potential level $V_2$ during the skip period during which the pixels in the skip areas Sub2 and Sub4 are skipped at blocks S132 and S133.

In block S133, the power circuit 140 may vary the low potential level $V_2$ of the pixel driving voltage ELVDD in proportion to the digital brightness value DBV during the skip period of the partial refresh frame PRFR. For example, during the skip period of the partial refresh frame PRFR, the power circuit 140 may lower the pixel driving voltage ELVDD to a first low potential level in response to a first digital brightness value and lower the pixel driving voltage ELVDD to a second low potential level lower than the first low potential level in response to a second digital brightness value lower than the first digital brightness value. Accordingly, the low potential level $V_2$ may be lowered when the digital brightness value DBV is lowered, while the low potential level $V_2$ may be increased when the digital brightness value DBV is increased. In this case, the low potential level $V_2$ of the pixel drive voltage ELVDD may be controlled such that the pixel drive voltage ELVDD increases to a voltage lower than the default voltage level $V_1$ even if the pixel drive voltage ELVDD rises.

During the refresh period of the partial refresh frame PRFR, the display panel driving circuit scans the pixels disposed in the refresh areas Sub1 and Sub3 and writes the pixel data RGB of the input image to the pixels under the control of the timing controller 130 at block S131.

During the skip period of the partial refresh frame PRFR, the pixels in the skip areas Sub2 and Sub4 are not scanned and maintain the previous data voltage at block S134.

Figure 14:
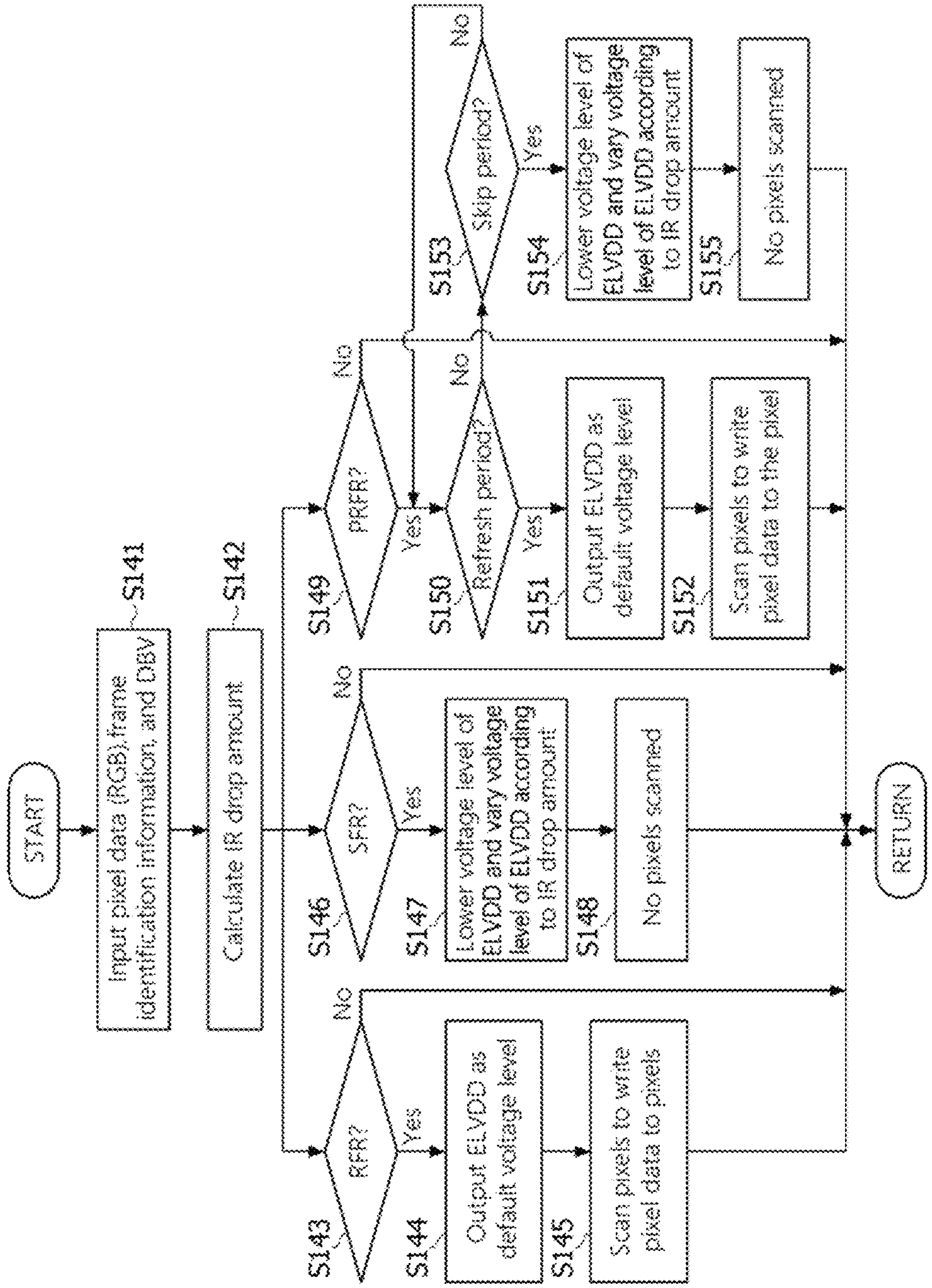
FIGS. 14, 15, and 16 are diagrams illustrating a method of driving a display device according to a third aspect of the present disclosure.
Figure 15:
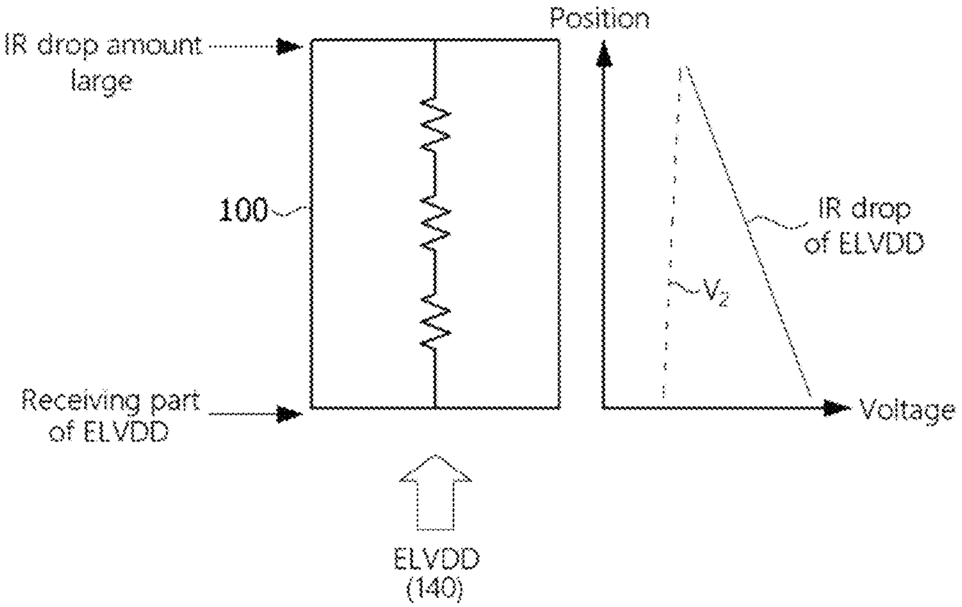
Figure 15:
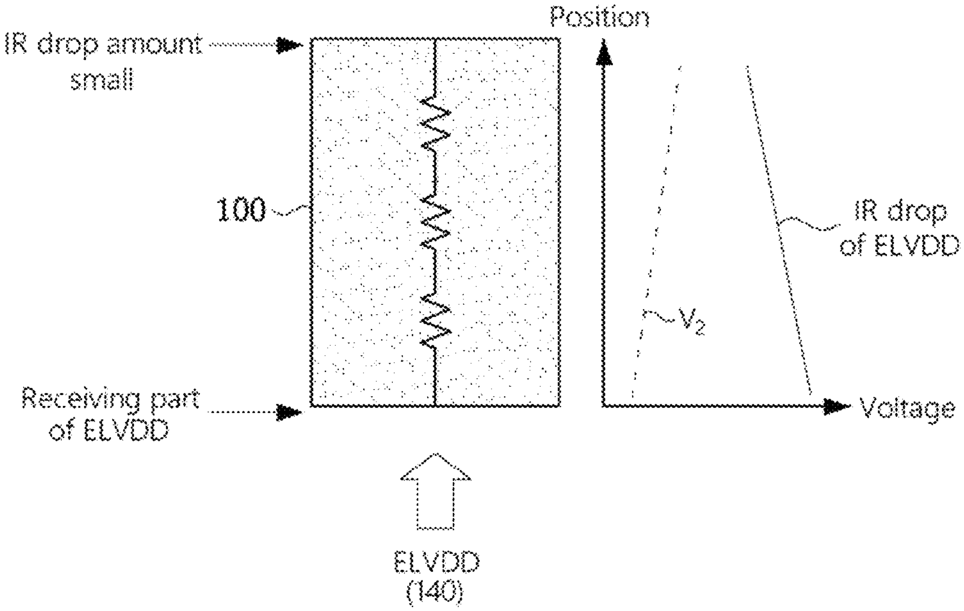

FIG. 14 is a flowchart illustrating a method of driving a display device according to a third aspect of the present disclosure. FIG. 15 is a diagram illustrating an example of how an amount of IR drop in the pixel driving voltage ELVDD varies depending on the image displayed on the display panel 100. As shown in FIG. 15, depending on the current (I) and resistance (R) flowing in the pixels, the pixel driving voltage ELVDD may be different at the position farthest from a receiving part to which the pixel driving voltage ELVDD is applied in the display area AA (e.g., from a passive resistance on the electrical line), resulting in a potential difference of the pixel drive voltage ELVDD depending on the positions of the pixels in the display area AA.

As shown in the upper part of FIG. 15, when the average luminance of the display area AA is high, the amount of current flowing through the pixels increases, resulting in a large voltage drop of the pixel drive voltage ELVDD. On the other hand, as shown in the lower part of FIG. 15, when the average luminance of the display area AA is low, the amount of current flowing through the pixels decreases, resulting in a small voltage drop of the pixel drive voltage ELVDD.

Even if the digital brightness value DBV is the same, the voltage level of the pixel drive voltage ELVDD applied to the pixel at the position farthest from the receiving part of the pixel driving voltage ELVDD in the display area AA may vary significantly depending on the amount of IR drop of the pixel drive voltage ELVDD.

The amount of IR drop is small because the receiving part of the ELVDD is close to the power circuit 140 in the display panel 100, while the amount of IR drop of the pixel driving voltage ELVDD applied to the pixel at the position far from the power circuit 140 is relatively large. During the period of the skip frame SFR and the skip period of the partial refresh frame PRFR, which is controlled by the control circuit, the power circuit 140 may lower the low voltage level $V_2$ of the driving voltage ELVDD, which has the relatively small amount of IR drop and is applied to the pixels close to the receiving part of the ELVDD, than the low potential level $V_2$ applied to the pixels far from the receiving part of the ELVDD. For example, the power circuit 140 may lower the low potential level $V_2$ applied to the pixels spaced apart from the power circuit 140 by a first distance than the low potential level $V_2$ of the pixel driving voltage ELVDD applied to the pixels spaced apart from the power circuit 140 by a second distance (e.g., greater than the first distance). The power circuit 140 may further lower the pixel driving voltage ELVDD when the average luminance of the display area AA is low under the control of the control circuit.

Accordingly, during the period of the skip frame SFR and the skip period of the partial refresh frame PRFR, the power circuit 140 may further lower the low potential level $V_2$ when a pixel line at a position having a small voltage drop of the pixel driving voltage ELVDD is scanned in the display panel 100, and may further lower the low potential level $V_2$ when an image with a small amount of IR drop is input.

The amount of IR drop of the pixel driving voltage ELVDD applied to the display panel 100 may be calculated based on the results of analyzing the pixel data of the input image. For example, the control circuit may calculate the amount of IR drop of the pixel driving voltage ELVDD based on an average picture level APL or a histogram of input image data. In this aspect, the power consumption reduction effect may be maximized by further lowering the low potential level $V_2$ of the pixel drive voltage ELVDD applied to the pixels with a relatively small amount of IR drop during the period of the skip frame SFR and the skip period of the partial refresh frame PRFR.

Figure 16:
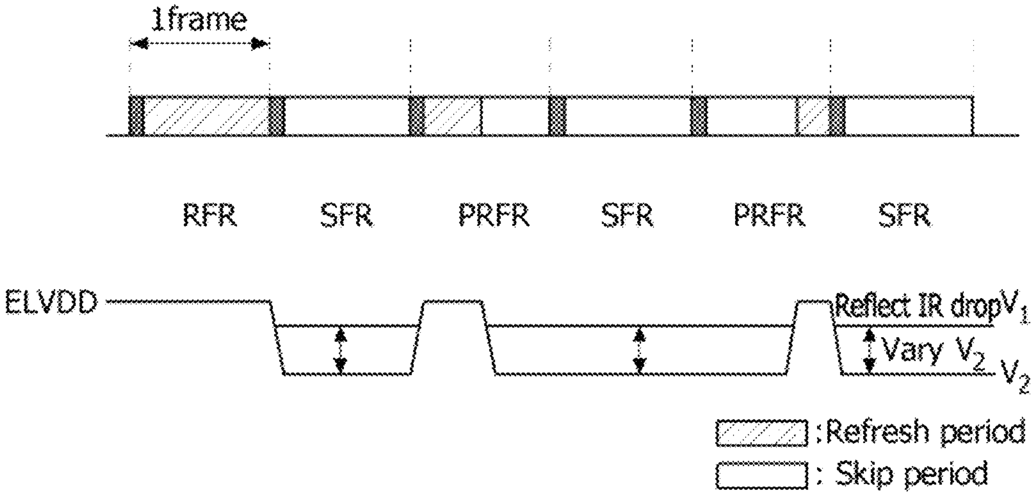

Referring to FIGS. 14 and 16, the display device may receive the pixel data RGB, the frame identification information, and the digital brightness value DBV information of an input image from the host system 200 at block S141.

The control circuit calculates the amount of IR drop of the pixel driving voltage ELVDD based on the result of analyzing the input image data at block S142.

When a current frame period is the refresh frame RFR at block S143, the default voltage level $V_1$ of the pixel driving voltage ELVDD is supplied to the pixels at block S144.

During the period of the refresh frame RFR, the pixels are scanned and pixel data RGB of the input image is written to the pixels at block S145.

When a current frame period is the skip frame SFR at block S146, the power circuit 140 lowers the voltage level of the pixel driving voltage ELVDD. The control circuit may vary the voltage level of the pixel driving voltage ELVDD according to the result of calculating the IR drop amount at block S147.

For example, the power circuit 140 may further lower the low potential level $V_2$ of the pixel driving voltage ELVDD when the pixels maintain the previous data voltage of an image with a small amount of IR drop during the skip frame SFR based on the control of the control circuit. When the image with the small amount of IR drop is maintained in the display area AA, the low potential level $V_2$ may be lower than when an image with a relatively large amount of IR drop is maintained in the display area AA. The low potential level $V_2$ of the pixel driving voltage ELVDD may be controlled so that the pixel driving voltage ELVDD rises to a voltage lower than the default voltage level $V_1$, even if the pixel drive voltage ELVDD rises. During the period of the skip frame SFR, the pixels are not scanned and maintain the previous data voltages at block S148.

When a current frame period is the partial refresh frame PRFR at block S149, the pixel driving voltage ELVDD may be controlled at different voltage levels for sub-areas divided in the display area AA. The pixel driving voltage ELVDD is applied at a default voltage level $V_1$ to the pixels in the refresh areas Sub1 and Sub3 during the refresh period of the partial refresh frame PRFR at blocks S150 and S151 and at a lower potential level $V_2$ to the pixels in the skip areas Sub2 and Sub4 during the skip period at blocks S153, S154 and S155.

In block S154, the power circuit 140 may vary the low potential level $V_2$ of the pixel driving voltage ELVDD in proportion to the amount of IR drop during the skip period of the partial refresh frame PRFR based on the control of the control circuit. For an image with a small amount of IR drop, the low potential level $V_2$ is lowered, while the low potential level $V_2$ for an image with a relatively large amount of IR drop may be increased. Even if the pixel driving voltage ELVDD applied to the pixels in the skip areas Sub2 and Sub4 rises, the low potential level $V_2$ of the pixel driving voltage ELVDD may be controlled so that the pixel driving voltage ELVDD increases to a voltage lower than the default voltage level $V_1$.

In the period of the partial refresh frame PRFR, the display panel driving circuit may scan the pixels in the refresh areas Sub1 and Sub3 during the refresh period and write the pixel data RGB of an input image to the pixels under the control of the timing controller 130 at block S152.

During the skip period of the partial refresh frame PRFR, the pixels in the skip areas Sub2 and Sub4 are not scanned and maintain the previous data voltage at block S155.

In carrying out the method of controlling the pixel driving voltage ELVDD, one or more control methods of the second and third embodiments may be applied to the first aspect together.

Figure 17:
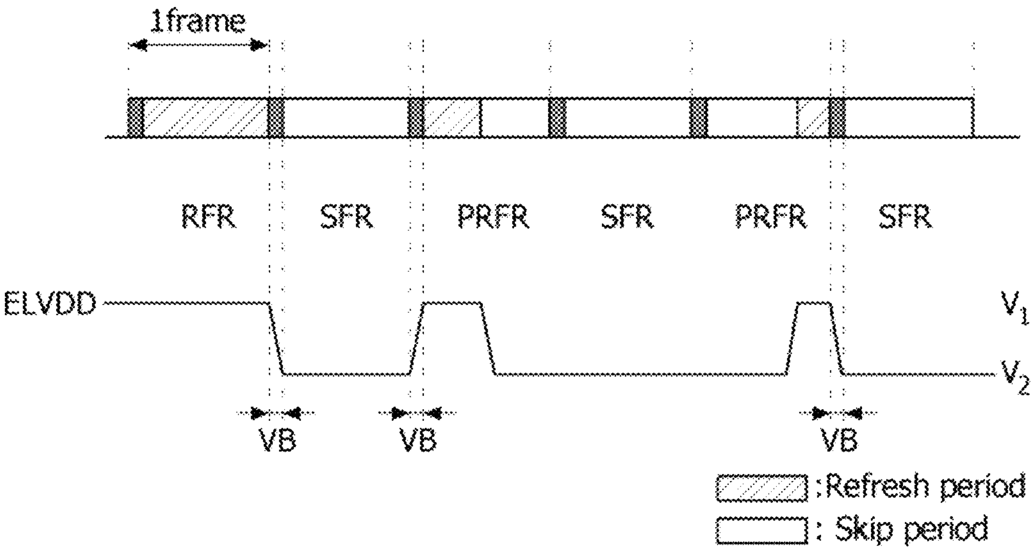
FIG. 17 is a diagram illustrating the timing of the change in a voltage level of a pixel driving voltage in accordance with some aspects of the disclosure.

In the low power mode, to reduce the luminance fluctuations of the pixels due to the changes in the pixel driving voltage ELVDD, the voltage level of the pixel driving voltage ELVDD may be changed in the same manner as shown in FIG. 17.

Referring to FIG. 17, the display device may receive a frame identification and a digital brightness value DBV from the host system during a vertical blank period VB when no input image is received.

The power circuit 140 may change the voltage level of the pixel driving voltage ELVDD to a low potential level $V_2$ during the vertical blank period VB before changing from the refresh frame RFR to the skip frame SFR based on the control of the control circuit.

The power circuit 140 may change the voltage level of the pixel driving voltage ELVDD to the default voltage level $V_1$ during the vertical blank period VB before changing from the skip frame SFR to the refresh frame RFR or the refresh period of the partial refresh frame PRFR based on the control of the control circuit.

The power circuit 140 may change the voltage level of the pixel drive voltage ELVDD to the default voltage level $V_1$ within the skip period before changing from the skip period to the refresh period during the period of the partial refresh frame PRFR based on the control of the control circuit.

The pixel driving voltage ELVDD rises in advance within the period of the skip frame SFR and the skip period of the partial refresh frame PRFR, allowing the pixels to driven stably during the refresh period of the refresh frame RFR and the partial refresh frame PRFR without changes in the pixel driving voltage ELVDD. When switching from the refresh period of the refresh frame RFR or the partial refresh frame PRFR to the skip period of the skip frame SFR or the partial refresh frame PRFR, the pixel driving voltage ELVDD is changed after a scan time enters the skip frame SFR or the skip area Sub2, and Sub4. As a result, the present disclosure may prevent the change in the luminance of the pixels due to the change in the pixel driving voltage in the display device and the mobile terminal.

Figure 18:
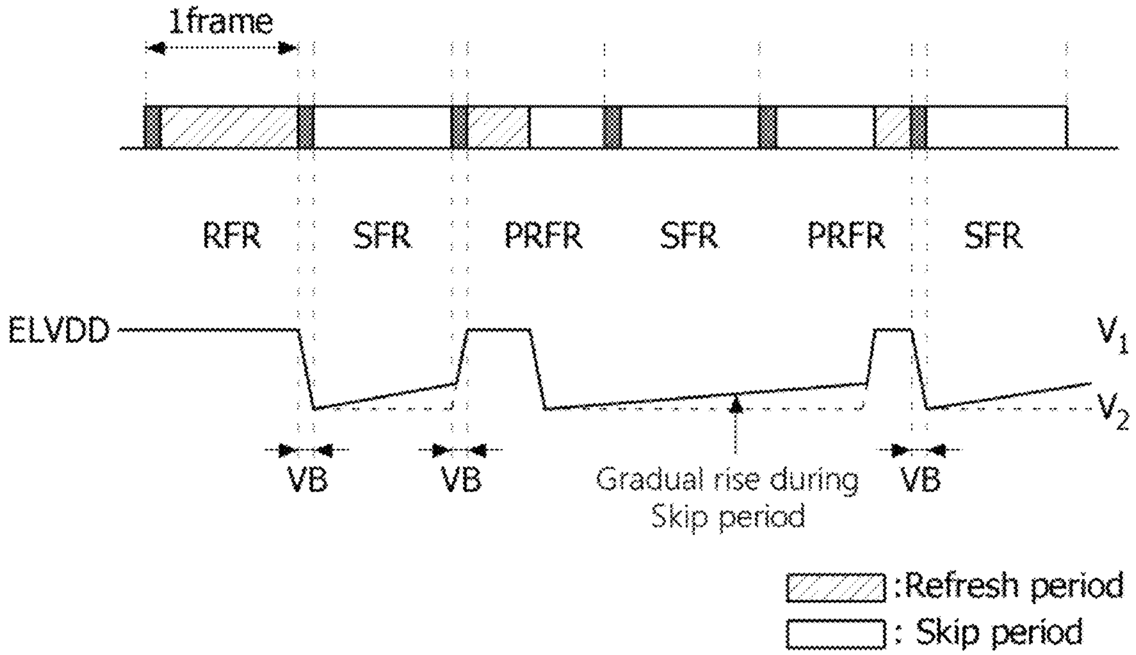
FIG. 18 is a diagram illustrating an example in which a low potential level of a pixel driving voltage gradually rises during a skip frame period and a pixel driving period of a skip area in accordance with some aspects of the disclosure.

As the period of the skip frame SFR or the skip period of the partial refresh frame PRFR increases, the gate voltage of the driving element DT may increase due to the leakage of the capacitor voltage of the pixel circuit, causing the luminance of the pixel to change. In this case, the gate-source voltage Vgs of the driving element DT decreases, which may gradually reduce the brightness of the pixel. To prevent such a change in the luminance of the pixel, the pixel driving voltage ELVDD is gradually increased over time during the period of the skip frame SFR period or the skip period of the partial refresh frame PRFR, as shown in FIG. 18. The power circuit 140 may gradually raise the pixel driving voltage ELVDD over time during the period of the skip frame SFR or the skip period of the partial refresh frame PRFR based on the control of the control circuit. When the pixel driving voltage ELVDD rises during the period of the skip frame SFR or the skip period of the partial refresh frame PRFR, the increase of the pixel driving voltage ELVDD may be limited so that the pixel driving voltage ELVDD rises to a voltage lower than the default voltage level $V_1$.

Figure 19:
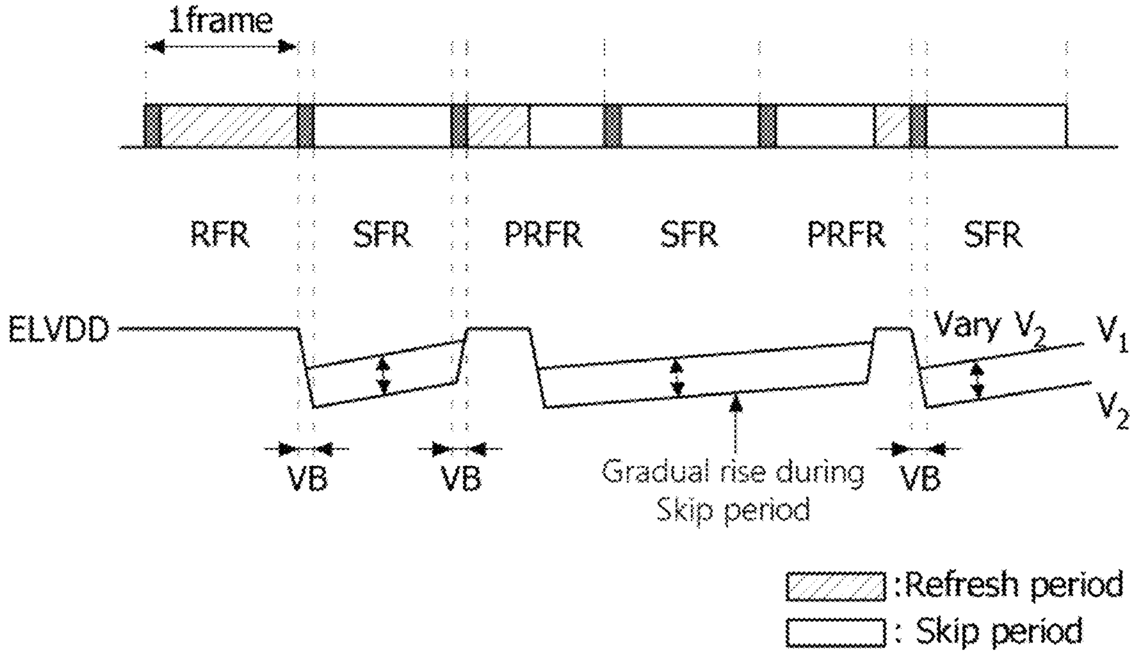
FIG. 19 is a diagram illustrating an example in which a low potential level of a pixel driving voltage gradually rises during a skip frame period and a pixel driving period of a skip area, and the low potential level of the pixel driving voltage varies in association with at least one of a digital brightness value and an amount of IR drop in accordance with some aspects of the disclosure.

The above-described embodiments may be applied together. For example, as shown in FIG. 19, the low potential level $V_2$ of the pixel driving voltage ELVDD gradually rises during the period of the skip frame SFR and the skip period of the partial refresh frame PRFR under the control of the control circuit, and the low potential level $V_2$ of the pixel driving voltage ELVDD may be varied in association with at least one of the digital brightness value DBV and the amount of IR drop. During the period of the skip frame SFR and the skip period of the partial refresh frame PRFR, even if the pixel driving voltage ELVDD rises gradually, the amount of the rise of the pixel driving voltage ELVDD may be limited so that the pixel driving voltage ELVDD rises to a voltage lower than the default voltage level.

Figure 20:
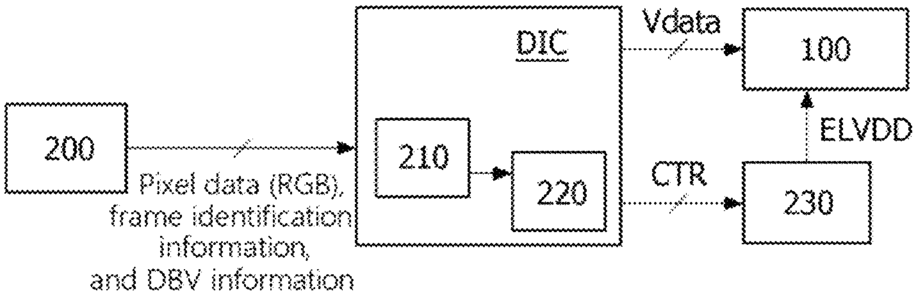
FIGS. 20 and 21 are diagrams illustrating circuits capable of changing a pixel driving voltage ELVDD in a mobile terminal in accordance with some aspects of the disclosure.
Figure 21:
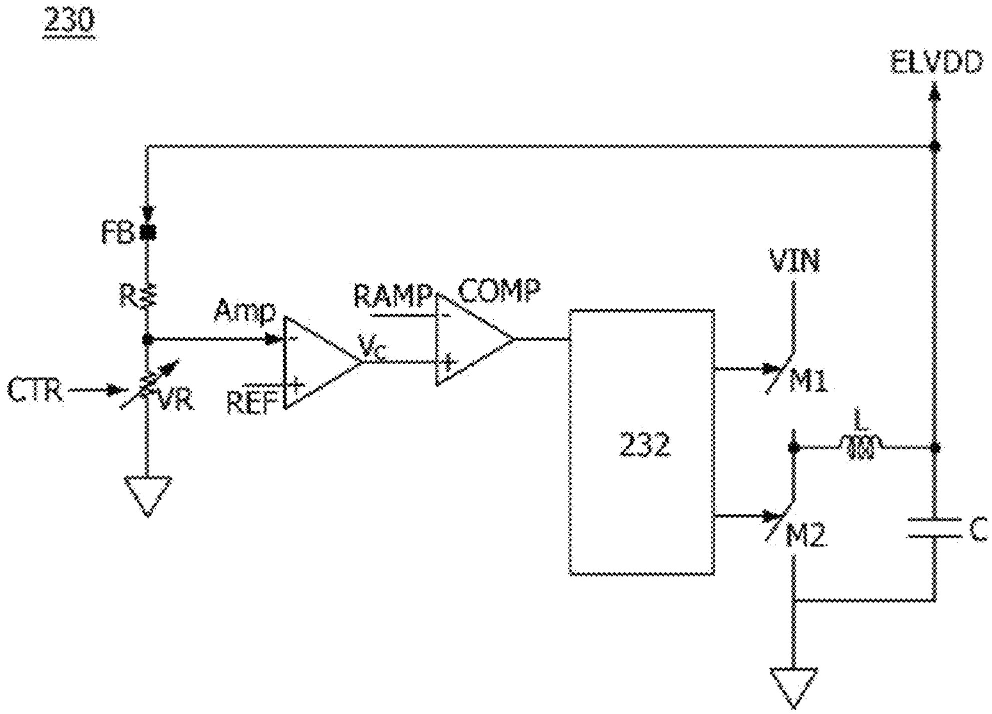
Figure 22:
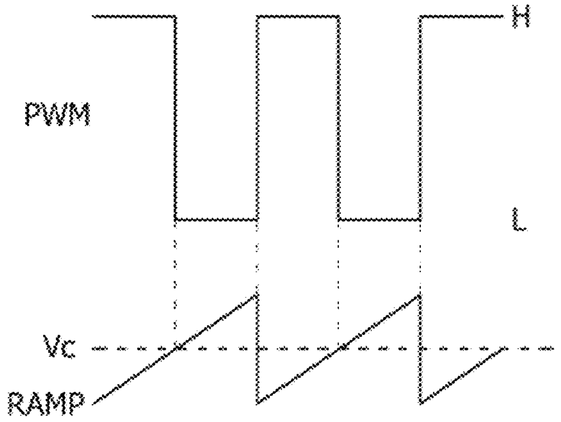
FIG. 22 is a waveform diagram illustrating an example of a triangular wave voltage inputted to the comparator as shown in FIG. 21 and an output voltage from an error amplifier as shown in FIG. 21, and a pulse width modulation (PWM) signal in accordance with some aspects of the disclosure.

FIGS. 20 and 21 are diagrams illustrating circuits capable of changing a pixel driving voltage ELVDD in a mobile terminal in accordance with some aspects of the disclosure. FIG. 22 is a waveform diagram showing an example of a triangular wave voltage RAMP inputted to the comparator COMP, an output voltage Vc from the error amplifier AMP, as shown in FIG. 21, and a pulse width modulation (PWM) signal in accordance with some aspects of the disclosure.

Referring to FIGS. 20 to 22, the host system 200 may transmit pixel data RGB, frame identification information, and digital brightness value DBV information of an input image to a DIC via a MIPI interface. The pixel data RGB, the frame identification information, and the digital brightness value DBV of the input image inputted to the DIC are digital signals.

The DIC may include a voltage calculator 210 and a voltage controller 220. The voltage calculator 210 receives the frame identification information and the digital brightness value DBV and calculates the amount of IR drop based on an analysis result of the input image. The voltage calculator 210 determines the period of the skip frame SFR and the skip areas Sub2 and Sub4 according to the frame identification information and calculates an appropriate value of the low potential level $V_2$ of the pixel driving voltage ELVDD applied to the pixels during the period of the skip frame SFR and the skip period of the partial refresh frame PRFR. The voltage calculator 210 may select the low potential level $V_2$ in association with one or more of the digital brightness value DBV and the amount of IR drop in the same manner as described in the various aspects above.

The voltage controller 220 receives the voltage value of the low potential level $V_2$ input from the voltage calculator 210 and outputs a control signal CTR for controlling an output of a pixel driving voltage output part 230. The control signal CTR is a digital signal. The low potential level $V_2$ of the pixel driving voltage ELVDD, the timing of the change of the pixel driving voltage ELVDD, and the amount of the change of the pixel driving voltage ELVDD may be controlled by the data value and the output timing of the control signal CTR.

The pixel driving voltage output part 230 may be implemented as, but not limited to, a buck converter circuit in the power circuit 140.

The pixel driving voltage output part 230 includes feedback resistors R, VR and a voltage generator connected between the feedback resistors R, VR and an ELVDD output terminal, as shown in FIG. 21.

The feedback resistors R and VR include a resistor R and a variable resistor VR connected in series between a feedback node FB and a ground voltage GND. A resistance value of the variable resistor VR may be changed in response to the control signal CTR. The variable resistor VR may be implemented with a digital variable resistor or a digital potentiometer whose resistance value is changed according to a digital data value. The feedback node FB is connected to the ELVDD output terminal from which the pixel driving voltage ELVDD is outputted.

The voltage generator includes an error amplifier AMP, a comparator COMP, a driver 232, a first transistor M1, a second transistor M2, an inductor L and a capacitor C.

The first and second transistors M1 and M2 are connected between an input voltage terminal to which an input voltage VIN is supplied and a ground voltage GND. The inductor L is connected between the node between the first transistor M1 and the second transistor M2 and the ELVDD output terminal. The capacitor C is connected between an ELVDD output terminal and the ground voltage GND.

The first transistor M1 is connected between the input terminal to which the input voltage VIN is applied and the inductor L. The first transistor M1 is turned on in response to a first gate signal received from the driver 232 and supplies the input voltage VIN to the inductor L. The first gate signal is generated in a high voltage VH section of the PWM signal.

The second transistor M2 is connected between the inductor L and the ground voltage GND. The second transistor M2 is turned on in response to a second gate signal inputted from the driver 232 to connect the inductor L to the ground voltage GND. The second gate signal is generated in a low voltage VL section of the PWM signal.

The error amplifier AMP amplifies a voltage difference between a reference voltage REF applied to a reference voltage input terminal (+) and a feedback voltage applied to a feedback input terminal (−) by its own gain. The feedback voltage is the node voltage between the resistor R and the variable resistor VR. The feedback voltage increases as the resistance value of the variable resistor VR increases. The reference voltage REF may be set to a voltage lower than the default voltage level $V_1$ of the pixel driving voltage ELVDD. As the feedback voltage increases, the voltage difference between the feedback voltage and the reference voltage REF decreases, reducing the output voltage Vc of the error amplifier AMP.

The comparator COMP includes a first input terminal (+) to which the output voltage Vc of the error amplifier AMP is applied, and a second input terminal (−) to which the triangle wave voltage RAMP shown in FIG. 22 is applied. The comparator COMP compares the output voltage Vc of the amplifier AMP with the triangle wave voltage RAMP and outputs a PWM signal PWM.

The PWM signal PWM is generated as a high voltage VH when the output voltage Vc of the error amplifier (AMP) is higher than the triangle wave voltage (RAMP), while it is generated as a low voltage VL when the output voltage Vc of the error amplifier AMP is lower than the triangular wave voltage RAMP. As the feedback voltage increases, the output voltage Vc of the error amplifier AMP decreases to lower the high voltage VH section of the PWM signal, thereby reducing the duty ratio of the PWM signal.

The driver 232 applies the first gate signal to the gate electrode of the first transistor M1 in response to the high voltage VH of the PWM signal to turn on the first transistor M1. The driver 232 applies the second gate signal to the gate electrode of the second transistor M2 in response to the low voltage VL of the PWM signal to turn on the second transistor M2. The larger the duty ratio of the PWM signal, the higher the voltage applied to the inductor L, resulting in a higher pixel drive voltage ELVDD, while the smaller the duty ratio of the PWM signal, the lower the voltage applied to the inductor L, resulting in a lower pixel drive voltage ELVDD. Depending on the channel type of the transistors M1 and M2, the driver 232 may turn on the first transistor M1 during the low voltage VL section of the PWM signal and turn on the second transistor M2 during the high voltage VH section of the PWM signal.

When the feedback voltage is increased by the variable resistor VR, the output voltage Vc of the error amplifier AMP is reduced, and the duty cycle of the PWM signal PWM is reduced, thereby lowering the voltage level of the pixel driving voltage ELVDD. Accordingly, the voltage controller 220 may lower the pixel driving voltage ELVDD at the period of the skip frame SFR and applied to the pixels in the skip areas Sub2 and Sub4 to a low potential level $V_2$ by changing the resistance value of the variable resistor VR with the control signal CTR, and vary the low potential level $V_2$.

The objects to be achieved by the present disclosure, the means for achieving the objects, and effects of the present disclosure described above do not specify essential features of the claims, and thus, the scope of the claims is not limited to the disclosure of the present disclosure.

Although the embodiments of the present disclosure have been described in more detail with reference to the accompanying drawings, the present disclosure is not limited thereto and may be embodied in many different forms without departing from the technical concept of the present disclosure. Therefore, the embodiments disclosed in the present disclosure are provided for illustrative purposes only and are not intended to limit the technical concept of the present disclosure. The scope of the technical concept of the present disclosure is not limited thereto. Therefore, it should be understood that the above-described embodiments are illustrative in all aspects and do not limit the present disclosure. The protective scope of the present disclosure should be construed based on the following claims, and all the technical concepts in the equivalent scope thereof should be construed as falling within the scope of the present disclosure.

What is claimed is:

1. A method of driving a display device comprising:
supplying a pixel driving voltage to a plurality of pixels disposed on a display panel;
scanning the plurality of pixels during a period of a refresh frame to write pixel data to the plurality pixels;
maintaining a data voltage previously charged during a skip frame period of a skip frame; and
decreasing the pixel driving voltage in the skip frame period of the skip frame.

2. The method of claim 1, further comprising:
scanning a first portion of pixels disposed in a refresh area of the display panel during a refresh period of a partial refresh frame, wherein a second portion of pixels belonging to a skip area of the display panel during a skip period of the partial refresh frame; and
decreasing an average voltage of the pixel driving voltage during the skip period of the partial refresh frame.

3. The method of claim 2, further comprising:
applying the pixel driving voltage to all of the pixels at a default voltage level during a refresh frame period of the refresh frame;
applying the pixel driving voltage to all of the plurality of pixels at a low potential level lower than the default voltage level during the period of the skip frame;
applying the pixel driving voltage to the first portion of pixels disposed in the refresh area at the default voltage level during the refresh period of the partial refresh frame; and
applying the pixel driving voltage to the second portion of pixels disposed in the skip area at a low potential voltage level during the skip period of the partial refresh frame.

4. A display device comprising:
a display panel on which a plurality of data lines, a plurality of gate lines, and a plurality of pixels to which a pixel driving voltage is supplied are disposed;
a display panel driving circuit configured to scan the plurality of pixels and write pixel data to the plurality of pixels during a refresh frame period of a refresh frame; and
a power circuit configured to output the pixel driving voltage and lower the pixel driving voltage in a skip frame period of a skip frame in which scanning of the plurality of pixels is skipped,
wherein the pixel driving voltage is applied to all of the plurality of pixels at a default voltage level during the refresh frame period, and the pixel driving voltage is applied to all of the plurality of pixels at a low potential level lower than the default voltage level during the skip frame period.

5. The display device of claim 4, wherein the power circuit is configured to:
decrease the pixel driving voltage to a first low potential level in response to a first digital brightness value, and
decrease the pixel driving voltage to a second low potential level lower than the first low potential level in response to a second digital brightness value lower than the first digital brightness value, during the skip frame period.

6. The display device of claim 4, wherein the power circuit is configured to:
allow the low potential level of the pixel driving voltage applied to pixels spaced apart from the power circuit by a first distance lower than the low potential level of the pixel driving voltage applied to pixels spaced apart from the power circuit by a second distance, and
wherein the second distance is greater than the first distance.

7. The display device of claim 4, wherein the power circuit is configured to:
change the low potential level based on a luminance associated with an image.

8. The display device of claim 4, wherein the power circuit is configured to:
decrease the low potential level when an amount of voltage drop of the display panel decreases.

9. The display device of claim 8, further comprising:
a control circuit configured to calculate a value of the voltage drop based on analyzing an input image and control the power circuit based on a drop amount of the voltage drop.

10. The display device of claim 4, wherein the power circuit is configured to gradually increase the low potential level during the skip frame period.

11. The display device of claim 4, wherein the power circuit is configured to:
change the pixel driving voltage to the low potential level during a vertical blank period before changing from the refresh frame to the skip frame; and
change the pixel driving voltage to the default voltage level during the vertical blank period before changing from the skip frame to the refresh frame.

12. A display device, comprising:
a display panel on which a plurality of data lines, a plurality of gate lines, and a plurality of pixels to which a pixel driving voltage is supplied are disposed;
a display panel driving circuit configured to scan the plurality of pixels and write pixel data to the plurality of pixels during a refresh frame period of a refresh frame; and
a power circuit configured to output the pixel driving voltage and lower the pixel driving voltage in a skip frame period of a skip frame in which scanning of the plurality of pixels is skipped,
wherein the display panel driving circuit is configured to:
scan a first portion of pixels disposed in a refresh area of the display panel to write pixel data to the first portion of pixels during a refresh period of a partial refresh frame, and skip a second portion of pixels disposed in a skip area of the display panel during a skip period of the partial refresh frame, wherein the power circuit is configured to decrease an average voltage of the pixel driving voltage during the skip period of the partial refresh frame, wherein the pixel driving voltage is applied to a plurality of pixels belonging to the refresh area at a default voltage level during the refresh period; and the pixel driving voltage is applied to a portion of pixels disposed in the skip area at a low potential level lower than the default voltage level during the skip period.

13. The display device of claim 12, wherein the power circuit is configured to:

decrease the pixel driving voltage to a first low potential level in response to a first digital brightness value, and in response to a second digital brightness value lower than the first digital brightness value, decrease the pixel driving voltage to a second low potential level lower than the first low potential level during the skip period of the partial refresh frame.

14. The display device of claim 12, wherein the power circuit is configured to gradually increase the low potential level during the skip period of a partial refresh frame period.

15. The display device of claim 12, wherein the power circuit is configured to:

change a voltage level of the pixel driving voltage to the default voltage level within the skip period before entering from the skip period to the refresh period.

16. The display device of claim 12, wherein the gate lines include:

a plurality of scan lines to which scan signals synchronized with a data voltage are sequentially applied; and a plurality of emission control lines to which light emission control signals are sequentially applied, and wherein the display panel driving circuit includes:

a data driver configured to output the data voltage to the data lines;

a scan driver configured to output the scan signals to the scan lines during the refresh frame period and the refresh period of the partial refresh frame; and an emission control driver configured to output the emission control signals to the plurality of emission control lines during the refresh frame period and the refresh period of the partial refresh frame, the skip frame period, and the skip period of the partial refresh frame.

17. A mobile terminal comprising:

a display panel on which a plurality of data lines, a plurality of gate lines, and a plurality of pixels to which a pixel driving voltage is supplied are disposed;

a driver integrated circuit configured to output the pixel driving voltage at a default voltage level during a refresh frame period of a refresh frame, scan the plurality of pixels, and output the pixel driving voltage at a low potential level lower than the default voltage level during a skip frame period of a skip frame and a period of a partial refresh frame; and a host system configured to provide pixel data of an input image, frame identification information, and digital brightness value information to the drive integrated circuit, wherein the frame identification information includes information indicating at least one of the refresh frame, the skip frame, and the partial refresh frame.

18. The mobile terminal of claim 17, wherein the drive integrated circuit includes:

a voltage calculator configured to receive the pixel data of the input image, the frame identification information, and the digital brightness value information and output a voltage value of the low potential level;

a voltage controller configured to receive the voltage value of the low potential level and output a control signal; and a voltage output part configured to lower a voltage level of the pixel driving voltage during the period of the skip frame and a skip period of the partial refresh frame in response to the control signal.

* * * * *